(12) United States Patent
Scott et al.

(10) Patent No.: US 10,055,763 B2
(45) Date of Patent: Aug. 21, 2018

(54) CLASSIFYING USER INTENT BASED ON LOCATION INFORMATION ELECTRONICALLY COMMUNICATED FROM A MOBILE DEVICE

(71) Applicant: ORACLE INTERNATIONAL CORPORATION, Redwood Shores, CA (US)

(72) Inventors: Tyler Lee Scott, Seattle, WA (US); Kristine E. Robison, San Jose, CA (US); Stephen John Papa, San Jose, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 264 days.

(21) Appl. No.: 14/681,050

(22) Filed: Apr. 7, 2015

(65) Prior Publication Data
US 2016/0125467 A1 May 5, 2016

Related U.S. Application Data

(60) Provisional application No. 62/072,651, filed on Oct. 30, 2014.

(51) Int. Cl.
*G06Q 30/00* (2012.01)
*G06Q 30/02* (2012.01)
(Continued)

(52) U.S. Cl.
CPC ..... *G06Q 30/0261* (2013.01); *G06Q 30/0269* (2013.01); *H04W 4/02* (2013.01);
(Continued)

(58) Field of Classification Search
None
See application file for complete search history.

(56) References Cited

U.S. PATENT DOCUMENTS

| 2013/0065584 A1 | 3/2013 | Lyon et al. |
| 2013/0281084 A1 | 10/2013 | Batada et al. |

(Continued)

FOREIGN PATENT DOCUMENTS

| CN | 107077692 | 8/2017 |
| EP | 3213534 | 9/2017 |

(Continued)

OTHER PUBLICATIONS

Google Maps, "The blue circle comes to your desktop", Jul. 9, 2009, 4 pages.
(Continued)

*Primary Examiner* — James M Detweiler
(74) *Attorney, Agent, or Firm* — Kilpatrick Townsend & Stockton LLP

(57) ABSTRACT

A method, system, and computer program product for classifying user intent based on spatial information relayed via a mobile device. Embodiments commence upon receiving a location beacon identification value originating from a location beacon, which location beacon identification value is then relayed to the server from the mobile device. The server determines a set of one or more rules based at least in part on the location beacon identification value, and then transmits at least a portion of a set of one or more rules to the mobile device, (e.g., using a mobile device carrier's infrastructure). The rules comprise triggers, and when a trigger fires, user categorization is determined and user intent is predicted. The user categorization and/or predicted user intent is used to select an advertising message.

18 Claims, 17 Drawing Sheets

(51) Int. Cl.
*H04W 4/02* (2018.01)
*H04W 4/04* (2009.01)
*H04W 4/80* (2018.01)
H04W 4/021 (2018.01)
H04W 4/21 (2018.01)
H04W 4/50 (2018.01)

(52) U.S. Cl.
CPC ............ *H04W 4/043* (2013.01); *H04W 4/80* (2018.02); *H04W 4/021* (2013.01); *H04W 4/21* (2018.02); *H04W 4/50* (2018.02)

(56) References Cited

U.S. PATENT DOCUMENTS

| | | | |
|---|---|---|---|
| 2014/0136312 A1 | 5/2014 | Saksena et al. | |
| 2014/0324615 A1* | 10/2014 | Kulkarni | H04W 4/70 705/26.1 |
| 2015/0079942 A1* | 3/2015 | Kostka | H04W 4/21 455/411 |
| 2016/0019603 A1* | 1/2016 | Reynolds | G06Q 30/0277 705/14.73 |
| 2016/0055527 A1 | 2/2016 | Wiener et al. | |
| 2016/0055540 A1 | 2/2016 | Chan et al. | |
| 2016/0055542 A1 | 2/2016 | Hui et al. | |
| 2016/0055546 A1 | 2/2016 | Chan et al. | |
| 2016/0094940 A1* | 3/2016 | Vigier | H04W 4/02 455/456.3 |
| 2016/0094946 A1* | 3/2016 | Keithley | H04W 4/023 455/456.3 |
| 2016/0125471 A1 | 5/2016 | Hsu et al. | |
| 2016/0132938 A1 | 5/2016 | Wiener et al. | |

FOREIGN PATENT DOCUMENTS

| | | |
|---|---|---|
| WO | 2016069956 A1 | 5/2016 |
| WO | 2016069956 A9 | 10/2016 |

OTHER PUBLICATIONS

Google Maps Help, "See your location on Maps", 2015, 3 pages.
International Search Report and Written Opinion dated Jan. 14, 2016 for corresponding PCT Patent Application No. PCT/US2015/058165, 11 pages.

* cited by examiner

CLASSIFYING USER INTENT BASED ON LOCATION INFORMATION ELECTRONICALLY COMMUNICATED FROM A MOBILE DEVICE

RELATED APPLICATIONS

The present application claims the benefit of priority to co-pending U.S. Provisional Patent Application Ser. No. 62/072,651, entitled "CLASSIFYING USER INTENT BASED ON SPATIAL INFORMATION FROM A LOCATION BEACON", filed Oct. 30, 2014 which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to the field of collecting Internet user demographics, and more particularly to techniques for delivering a rule base to a mobile device to act on spatial information to assign user interests and predict user intentions.

BACKGROUND

As the use of mobile devices becomes more ubiquitous, advertisers and brand owners strive to leverage the physical or geographical location of the mobile device and the intent of a respective mobile device user in order to drive highly targeted advertising campaigns. Some legacy systems deploy GPS technology to provide geographically relevant data. For example, a search for restaurants using the map application on a mobile phone will use GPS to determine a list of restaurants near the current device location. To establish a more precise location, other legacy systems deploy one or more small wireless transmitters or "location beacons" that communicate with nearby devices using short-range wireless technology (e.g., Bluetooth low energy or BLE technology). In such cases, the term nearby refers to the theoretical range of BLE beacons (e.g., about 100 meters). For example, Major League Baseball has deployed beacons to at least 20 baseball stadiums for various purposes. Over 25,000 other beacons have also been deployed to various other sites (e.g., retail stores) for various other purposes.

When a receiver (e.g., in a mobile device) is in range of a beacon and establishes a communication link, the beacon provides signals (e.g., packets of data) that comprise a location beacon identification value that can be detected by the receiver, and from which signals or packets the receiver can determine the identity of the beacon or beacons it is near. The beacon identification value can be formed of an identifier that is specific to each beacon (e.g., unique to each beacon from among a larger set of beacons). The distance from each beacon can be determined, at least in part from the received signal strength. For example, a retail store can use a BLE beacon to detect when a device enters the store in order to deliver product discount coupons or some other push notification to the device using an application running on the device.

Certain uses of, or combinations of, the aforementioned legacy systems and techniques can serve to determine the geographical location of a given device. However, advertisers may also want to know more about the device user's activity and intentions at a particular location. Advertisers may additionally desire user device data from other locations and even other devices a user may have (e.g., a laptop, a tablet device, etc.). Further, advertisers may want to leverage the vast amount of online user demographics and other user-specific data when determining messaging to deliver to a user's mobile device. As a specific example, advertisers and/or brand owners might want to deploy beacons at certain product booths at a tradeshow. In such cases, the occurrence of a visit such as a walk-by or momentary pause by a visitor, including anonymous visitors that are nearby a booth having a beacon, can be registered. The visitor can then be the recipient of various communications (e.g., marketing communications via campaigns using Twitter, Google, etc.) and/or communications to drive a call to action (e.g., go to a website, provide contact information, download a whitepaper, etc.). In another example, advertisers and/or brand owners might want to place beacons in proximity of certain products in a store (e.g., white wine and red wine) to capture the appearance of users near those products. The advertisers and/or brand owners might want to push notifications (e.g., coupons, new product information, etc.) and alerts (e.g., soon-expiring promotions, availability of cross-promotions, etc.) based on their current location, previous visits, time at each location, offline activity (e.g., online wine buying), and other information.

Unfortunately, performing spatial and temporal analysis and/or applying spatial and/or temporal rules over a user and his/her mobile device and their location and movement does not scale as the number of users gets large. Legacy attempts are limited in their use and application of technology in that they fail to scale as users, devices and venues are added, and legacy attempts place unnecessary burdens on centralized computing infrastructures.

None of the aforementioned legacy approaches achieve the capabilities as herein-disclosed. Therefore, there is a need for improvements.

SUMMARY

The present disclosure provides improved systems, methods, and computer program products suited to address the aforementioned issues with legacy approaches. More specifically, the present disclosure provides a detailed description of techniques used in systems, methods, and in computer program products for delivering a rule base to a mobile device to deliver spatial information used in determining user interests and predicting user intentions. Certain embodiments are directed to approaches for using rules and real-time spatial information to predict user interests and intentions, which embodiments advance the technical fields for providing advertisers more information about a user (e.g., interests, intentions) based on user location or other spatial information, as well as advancing peripheral technical fields. The disclosed embodiments modify and improve over conventional approaches, and some embodiments and techniques disclosed herein improve the functioning of multiple systems within the disclosed environments. In particular, practice of the disclosed techniques reduces use of computer memory, reduces demand for computer processing power, and reduces communication overhead needed for providing advertisers more information about a user based on user location or other spatial or temporal information.

Embodiments commence upon receiving a location beacon identification value originating from a location beacon, which location beacon identification value is then relayed to the server from the mobile device. The server determines a set of one or more rules based at least in part on the location beacon identification value, and then transmits at least a portion of a set of one or more rules to the mobile device, (e.g., using a mobile device carrier's infrastructure). The rules comprise triggers, and when a trigger fires, user categorization is determined and user intent is predicted. The user categorization and/or predicted user intent is used to select an advertising message.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
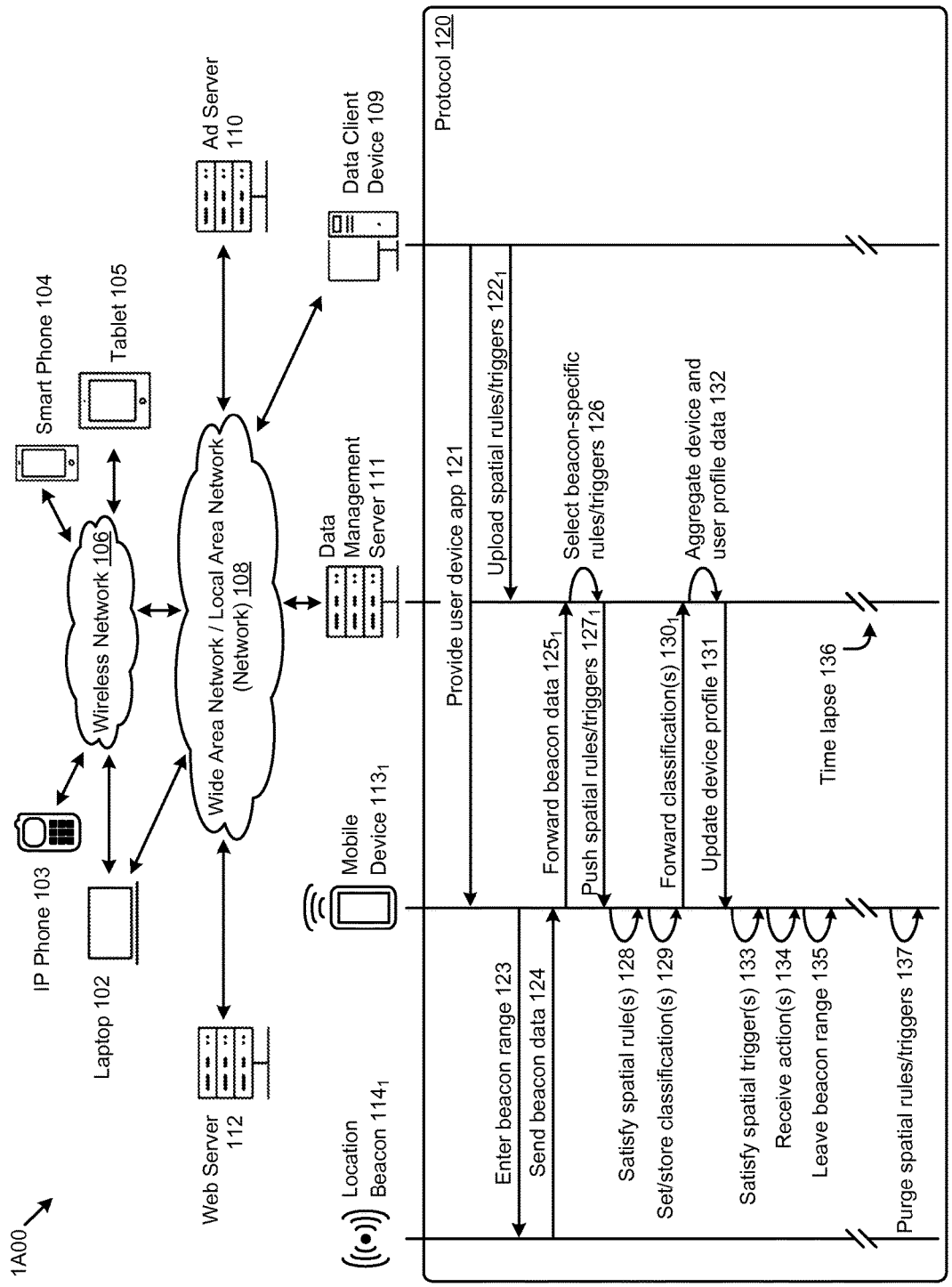
FIG. 1A exemplifies an environment that supports a protocol for collecting and classifying spatial information to be included in a user profile, according to one embodiment.

Some embodiments of the present disclosure address the problem of providing advertisers more information about a user (e.g., interests, intentions) based on user location or other spatial information, and some embodiments are directed to approaches for using rules and real-time spatial information to predict user interests and intentions. More particularly, disclosed herein and in the accompanying figures are exemplary environments, systems, methods, and computer program products for delivering a rule base to a mobile device. The execution of rules by the mobile device serve to deliver detailed temporal and spatial information that is used in determining user interests and predicting user intentions.

Overview

The present disclosure provides an improved method, system, and computer program product suited to address the aforementioned issues with legacy approaches. More specifically, the present disclosure provides a detailed description of techniques used in methods, systems, and computer program products for delivering a rule base to a mobile device to deliver spatial information used in determining user interests and predicting user intentions. The claimed embodiments address the problem of providing advertisers more information about a user (e.g., interests, intentions) based on user location or other spatial information. More specifically, some claims are directed to approaches for determining spatial classification rules and action triggers to be pushed from a data management server to a mobile device based on the device location, and combining captured mobile device activity and classifications with other device and user profiles, which claims advance the technical fields for capturing user activity and intentions across multiple locations and devices, and combining spatial information with online profile information, as well as advancing peripheral technical fields. Some claims improve the functioning of multiple systems within the disclosed environments.

Various embodiments are described herein with reference to the figures. It should be noted that the figures are not necessarily drawn to scale and that the elements of similar structures or functions are sometimes represented by like reference numerals throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A exemplifies an environment 1A00 that supports a protocol for collecting and classifying spatial information to be included in a user profile. As an option, one or more instances of environment 1A00 or any aspect thereof may be implemented in the context of the architecture and functionality of the embodiments described herein. Also, the environment 1A00 or any aspect thereof may be implemented in any desired environment.

As shown in FIG. 1A, environment 1A00 comprises one or more instances of a web server 112, one or more instances of a data management server 111, one or more instances of an ad server 110, one or more instances of a data client device 109 (e.g., server, desktop computer, etc.), and a variety of types and instances of user devices (e.g., a laptop 102, an IP phone 103, a smart phone 104, and a tablet 105). The aforementioned servers and devices can communicate through a wireless network 106 and a network 108 (e.g., a wide area network (WAN), a local area network (LAN), etc.). Environment 1A00 further comprises a representative instance of a mobile device $113_1$ (e.g., smart phone 104) and a location beacon $114_1$ (e.g., BLE beacon). Though not shown for simplicity, mobile device $113_1$ and location beacon $114_1$ can be connected to wireless network 106 and/or network 108. Also shown in environment 1A00 is a protocol 120 that depicts operations and communications on and among mobile device $113_1$, location beacon $114_1$, data management server 111, and data client device 109. Specifically, protocol 120 depicts components and operations for capturing user activity and intentions across multiple locations and devices, and combining spatial information with online profile information according to some embodiments. In this example, a data client user (e.g., advertiser, publisher, retail brand owner, etc.) at data client device 109 develops and provides a user device app (e.g., software application) to be downloaded and installed to mobile device $113_1$ (see message 121). The data client user at data client device 109 also uploads spatial rules and triggers to data management server 111 (see message $122_1$). The spatial rules and triggers relate to the user device app and its responses to one or more user devices (e.g., mobile device $113_1$) entering and leaving the ranges of one or more beacons (e.g., location beacon $114_1$).

As shown in protocol 120, for example, mobile device $113_1$ can enter the beacon range of location beacon $114_1$ (see message 123). The location beacon or beacons will then send beacon data (e.g., beacon UUID, detected range, etc.) back to mobile device $113_1$ (see message 124). The aforementioned beacon data can be an identification value in the form of a universally unique identifier (UUID) that is specific to each beacon (e.g., unique to each beacon from among a larger set of beacons). Mobile device $113_1$ can then forward beacon data to data management server 111 (see message $125_1$), which will select beacon-specific rules and triggers based on the beacon data received (see operation 126). Data management server 111 will then push a spatial rules and triggers file to mobile device $113_1$ for further potential operations (see message $127_1$). For example, the spatial rules and triggers file can include program code variables to be used in conditional logic executed on the mobile device $113_1$. If the activity of mobile device $113_1$ (e.g., "remaining near product A for X seconds") satisfies one or more spatial rules (see operation 128), then one or more device classifications will be set and stored according to the uploaded rules and triggers (see operation 129). The classifications will then be forwarded to the data management server 111 for further processing (see message $130_1$). For example, data management server 111 can aggregate the device data (e.g., classifications) with other user and/or device profile data previously collected (see operation 132). The new or updated device profile data is then uploaded back to mobile device $113_1$ (see message 131). If the activity of mobile device $113_1$ (e.g., "indicate classification of 'High-Interest' when user remains at location of product A for Y seconds or more") satisfies one or more spatial triggers (see operation 133), then mobile device $113_1$ can receive or initiate one or more actions (see operation 134) such as push notifications, log events, etc. At some later time, the mobile device $113_1$ might leave the beacon range (see operation 135). After a time lapse 136 (e.g., specified in the spatial rules and triggers), the spatial rules and triggers uploaded to the mobile device $113_1$ for location beacon $114_1$ can be purged from mobile device $113_1$ (see operation 137). Such purge operations help manage the amount of required data storage capacity on mobile device $113_1$ as the device moves in and out of various beacon ranges. An example commercial environment that presents a need for collecting and classifying spatial information to be included in a user profile as depicted in protocol 120, and described herein, is disclosed in FIG. 1B.

Figure 1B:
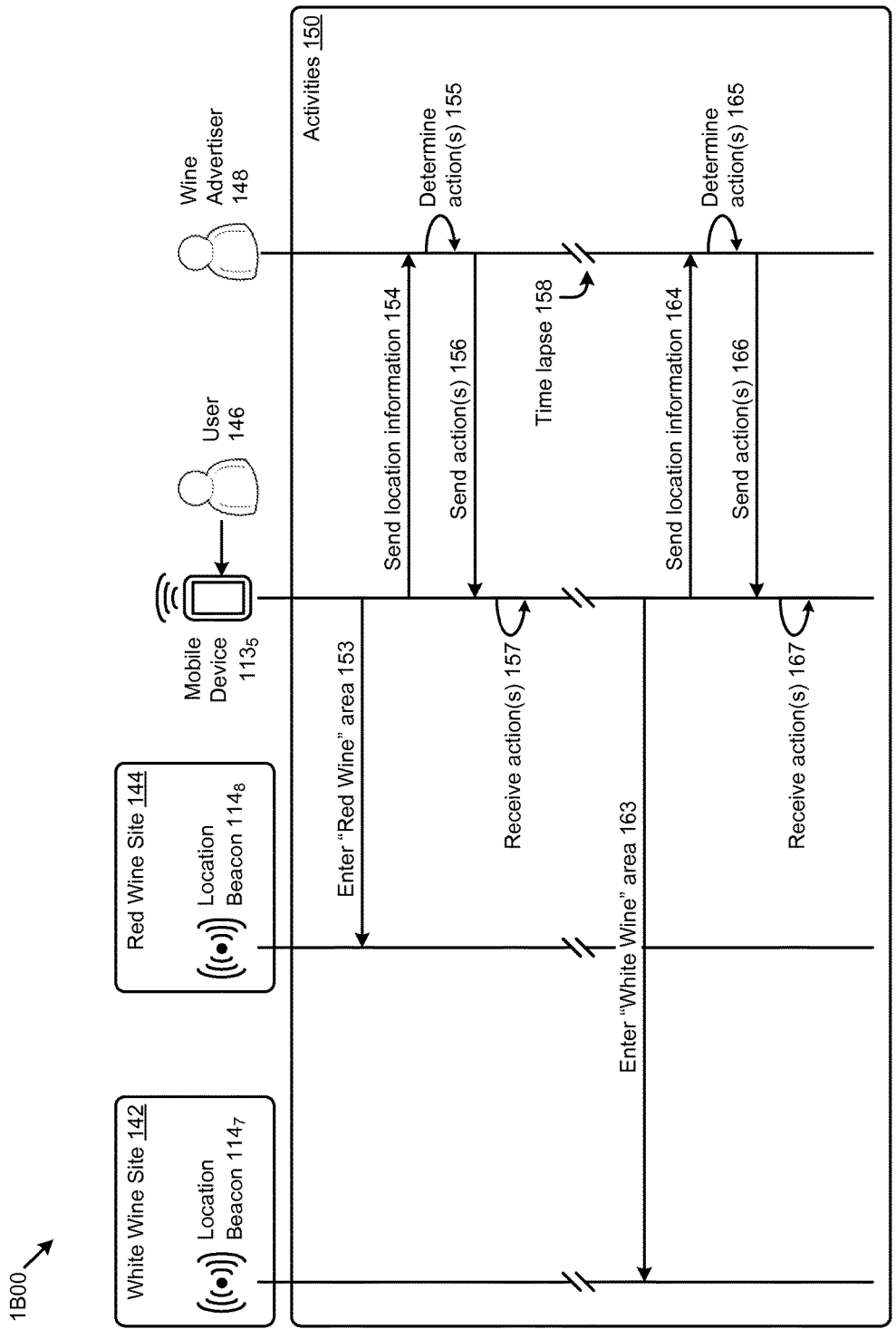
FIG. 1B presents a commercial environment that presents a need for collecting and classifying spatial information to be included in a user profile.

FIG. 1B presents a commercial environment 1B00 that presents a need for collecting and classifying spatial information to be included in a user profile. As an option, one or more instances of commercial environment 1B00 or any aspect thereof may be implemented in the context of the architecture and functionality of the embodiments described herein. Also, the commercial environment 1B00 or any aspect thereof may be implemented in any desired environment.

Specifically, as an example, commercial environment 1B00 depicts a wine advertiser 148 that has an interest in the location of a user 146 (e.g., operating a mobile device $113_5$) relative to a white wine site 142 and a red wine site 144 that have displayed for sale white wine and red wine products, respectively, of the wine advertiser 148. As an example, the sites can be at different retail stores (e.g., store #567 and store #560), within the same store, or any other possible physical location combinations. The wine advertiser 148 has further placed a location beacon $114_7$ and a location beacon $114_8$ at the white wine site 142 and the red wine site 144, respectively, to assist in assessing the location of user 146. As an example, as shown in a set of activities 150, the user 146 can initially enter the red wine site 144 (see message 153). The wine advertiser 148 would like to know that user 146 is near the red wine, specifically, the location and temporal information pertaining to user 146 (see message 154). With such information, the wine advertiser 148 can determine any actions to take (see operation 155). For example, the wine advertiser 148 might send a push notification describing a red wine sale, a coupon for red wine, and/or other content to the user 146. The content and purpose of the action can be based on various factors (e.g., how long the user is at the site, previous site visits by the user, etc.). As another example, the wine advertiser 148 would want to know that the user 146 also shops for wine using online outlets (e.g., using another computing device to access the online outlets). The advertiser might provide a coupon to be used for a future online purchase (e.g., upon an purchase of red wine). Once the actions have been determined, the actions can be sent to the user 146 (see message 156) and received by the user 146 (see operation 157). For example, the push notifications can be displayed by one or more applications operating on the mobile device $113_5$ (e.g., advertiser app, web browser, email, etc.). Strictly as another example, a determined or predicted user intention (e.g., to buy some wine) can be used in turn to determine an advertising message.

After a time lapse 158, the user 146 can enter the white wine site 142 (see message 163). The wine advertiser 148 would further like to know that user 146 is now near the white wine, specifically, the location information of user 146 (see message 164). With such information, the wine advertiser 148 can determine any actions to take (see operation 165). For example, the wine advertiser 148 might send a push notification describing a white wine sale, a coupon for white wine, or other content to the user 146. The content and purpose of the action can be based on various factors (e.g., how long the user is at the site, previous site visits by the user, etc.). As an example, the wine advertiser 148 would want to know that the user 146 was recently at the red wine site 144 and take appropriate actions (e.g., provide a coupon for red wine upon purchase of white wine, etc.). Once the actions have been determined, the actions can be sent to the user 146 (see message 166) and received by the user 146 (see operation 167). For example, the push notifications can be displayed by one or more applications operating on the mobile device $113_5$ (e.g., advertiser app, web browser, email, etc.).

Figure 2A:
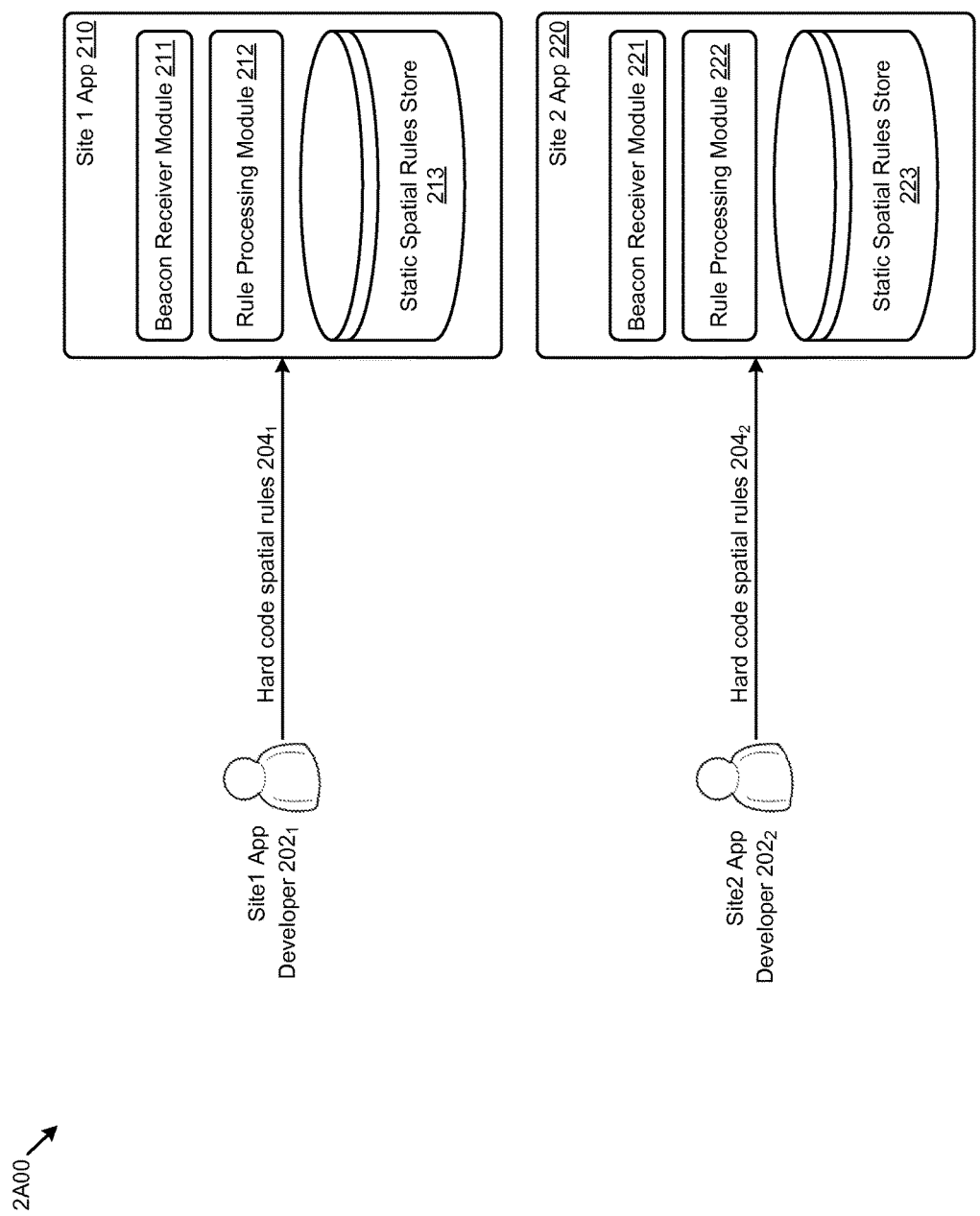
FIG. 2A depicts a diagram used for comparing to systems that implement collecting and classifying spatial information to be included in a user profile.

For comparison, a legacy approach for addressing the needs of the wine advertiser 148 in commercial environment 1B00 is described in FIG. 2A.

FIG. 2A depicts a diagram 2A00 used for comparing to systems that implement collecting and classifying spatial information to be included in a user profile. As an option, one or more instances of diagram 2A00 or any aspect thereof may be implemented in the context of the architecture and functionality of the embodiments described herein. Also, the diagram 2A00 or any aspect thereof may be implemented in any desired environment.

As shown in FIG. 2A, diagram 2A00 comprises a site1 app 210 and a site2 app 220 that can be installed on one or more user devices (e.g., mobile device $113_1$). Diagram 2A00 also shows a site1 app developer $202_1$ and a site2 app developer $202_2$ who will design and program the site1 app 210 and the site2 app 220, respectively. The app developers can be individuals or groups of individuals, and can be employed by the data client (e.g., advertiser, publisher, retail brand owner, coupon provider, etc.) or under contract with the data client as third-party developers. When developing the app, the app developers will, in part, each statically embed (e.g., hard code) the spatial rules (e.g., spatial rules $204_1$, spatial rules $204_2$, etc.) that are associated with the specific beacons associated with each app. The spatial rules can be associated with a single geographical location or site (e.g., store #567) or, at most, various sites owned and/or controlled by a single data client. The site1 app 210 and site2 app 220 each comprise various modules unique to each app including, in part, beacon receiver modules (e.g., beacon receiver module 211, beacon receiver module 221, etc.), rule processing modules (e.g., rule processing module 212, rule processing module 222), and static spatial rules storage (e.g., static spatial rules store 213, static spatial rules store 223). The beacon receiver module listens for and receives signals (e.g., beacon UUID) from the specific beacons associated with each app. The rule processing module determines the action the app should take (e.g., push notification) based on the beacon information and embedded rules located in the static spatial rules store.

For example, a retail store at site1 might have a beacon (e.g., UUID="1234") at the store entrance to detect when a device has entered the store. The retail store owner might then develop the site1 app 210 to look for beacon "1234" and send a welcome message and daily specials to the device running the app when it has entered the store. In this example, the app and the embedded rules are specific to the particular store (e.g., site1) and the beacons within the store or site. If the device entered a different store or site (e.g., site2), even if beacons controlled by another data client were present, the site1 app 210 would remain inactive as it is only programmed for site1 beacons. While the apps shown in diagram 2A00 can serve to determine the geographical location of a given device, they cannot discern more information about user activity and intentions at a particular location. Further, the apps shown in diagram 2A00 cannot collect or share user and device data from sites other than those for which the app was designed. The apps in diagram 2A00 are therefore limited in addressing the need for capturing user activity and intentions across multiple locations and devices, as well as combining spatial information with online profile information. Specifically, in the commercial environment 1B00 of FIG. 1B, the legacy approach described in diagram 2A00 would limit the ability of the wine advertiser 148 to have knowledge of the proximity of the user 146 to specific products (e.g., red wine, white wine, etc.), visits to other wine stores and wine products, related wine activities and interests (e.g., online shopping) on other computing devices, etc. An improved approach implementing the herein disclosed techniques is described in FIG. 2B.

Figure 2B:
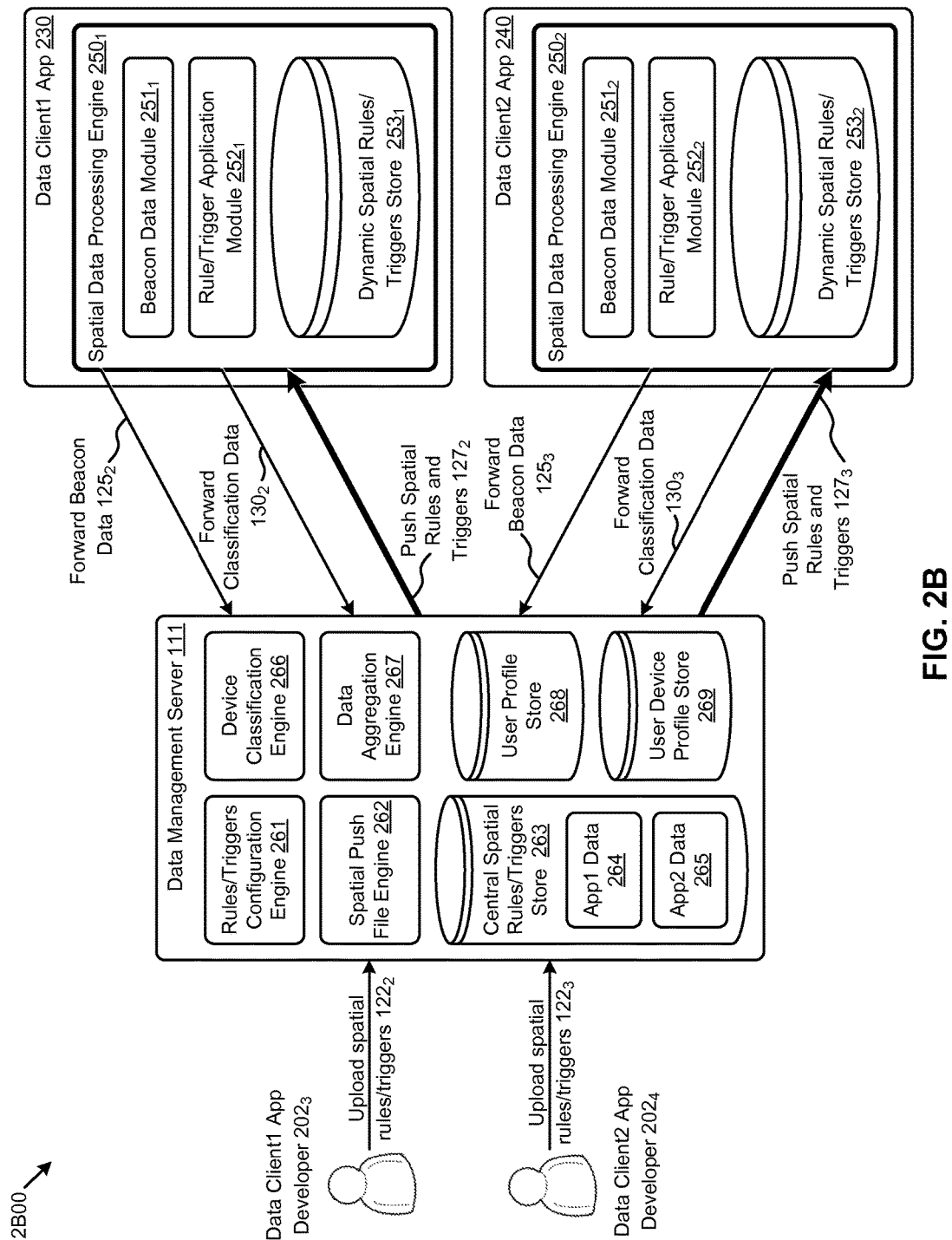
FIG. 2B is a block diagram of a system that pushes rules and triggers that are used for collecting and classifying spatial information to be included in a user profile, according to an embodiment.

FIG. 2B is a block diagram 2B00 of a system that pushes rules and triggers that are used for collecting and classifying spatial information to be included in a user profile. As an option, one or more instances of block diagram 2B00 or any aspect thereof may be implemented in the context of the architecture and functionality of the embodiments described herein. Also, the block diagram 2B00 or any aspect thereof may be implemented in any desired environment.

As shown in FIG. 2B, block diagram 2B00 comprises a data client1 app 230 and data client2 app 240 that can be installed on one or more user devices (e.g., mobile device $113_1$). The block diagram 2B00 shows a data client1 app developer $202_3$ and a data client2 app developer $202_4$ who will design and program the data client1 app 230 and data client2 app 240, respectively. Block diagram 2B00 further comprises an instance of data management server 111. The app developers can be individuals or groups of individuals, and can be employed by the data client (e.g., advertiser, publisher, retail brand owner, coupon provider, etc.) or under contract with the data client as third-party developers. When developing the app, the app developers will, in part, each upload to data management server 111 the spatial rules and triggers (e.g., see message $122_2$ and message $122_3$) for beacons associated with each app. The set of beacons to which the uploaded rules and triggers apply can cover multiple apps, multiple sites, and even multiple data clients under certain collaboration agreements.

The data client1 app 230 and data client2 app 240 each comprise an instance of a plurality of spatial data processing engines 250 (e.g., spatial data processing engine $250_1$, spatial data processing engine $250_2$), as shown. The spatial data processing engines 250 can have associated application programming interfaces (e.g., APIs), libraries, and utilities that can facilitate efficient implementation of the engine in multiple apps using, for example, a software development kit (e.g., SDK). Each instance of the spatial data processing engines 250 comprises various common modules including, in part, beacon data modules 251 (e.g., beacon data module $251_1$ and beacon data module $251_2$), rule and trigger application modules 252 (e.g., rule/trigger application module $252_1$ and rule/trigger application module $252_2$) and a dynamic spatial rules and triggers stores 253 (e.g., dynamic spatial rules/triggers store $253_1$ and dynamic spatial rules/triggers store $253_2$). The beacon data modules 251 listen for and receive signals from any beacons in range of the user device running the app from which it can determine detailed data (e.g., beacon UUID, beacon range, beacon duration, etc.).

Beacons can be labeled with a beacon UUID, and the beacon UUID can be used for purposes other than for merely identification of a beacon. In many cases a UUID is formed of major value and a minor value. Either or both the major value and minor value of the UUID can be sent to a listening device. In some settings there can be multiple beacons with the same label (e.g., a generic label). In such cases, consideration of the UUID major value and minor value and/or other labeling values serve to uniquely identify the beacon. Strictly as one example, a label or unique ID can be stored as a 20 bytes long identifier value that is divided into a proximity ID (e.g., 16 bytes), major value (e.g., 2 bytes), and minor value (e.g., 2 bytes).

The beacon data modules 251 engage in a protocol with user devices such that the spatial data processing engines 250 and the apps can be configured to work with multiple beacon types from multiple manufacturers. The beacon data modules 251 further drive communication of the received beacon data to the data management server 111. The rules and triggers application modules 252 receive the spatial rules and triggers pushed from data management server 111 and store them in the dynamic spatial rules and triggers stores 253. The rules and triggers application modules 252 further determine the action the app should take (e.g., push notification, classification, log event, etc.) based on the current beacon data and current relevant set of rules and triggers. Other data (e.g., device classifications, device profiles, etc.) can also be stored in the dynamic spatial rules and triggers stores 253 or similar storage modules accessible by the spatial data processing engines 250.

Block diagram 2B00 further shows a data management server 111 comprising various modules including, in part, a rules/triggers configuration engine 261, a central spatial rules/triggers store 263, a spatial push file engine 262, a device classification engine 266, a data aggregation engine 267, a user profile store 268, and a user device profile store 269. The rules/triggers configuration engine 261 provides, in part, an administrator interface (e.g., through data client device 109) for the app developer or another authorized user to configure and upload the rules and triggers for all beacons associated with each app (e.g., app1 data 264 and app2 data 265). As shown, beacon data is communicated (e.g., see message $125_2$ and message $125_3$) from the user device (e.g., by data client1 app 230 and data client2 app 240), and the data management server responds in turn by delivering (e.g., pushing) spatial rules and spatial triggers (e.g., see message $127_2$ and message $127_3$) to the spatial data processing engines 250 within the respective user devices.

Rules and triggers from data clients deploying any one or more instances of spatial data processing engines 250 in their apps are stored in the central spatial rules/triggers store 263. The spatial push file engine 262, in part, determines and builds the rules and triggers push file to upload to a given user device based on the data (e.g., beacon data, classification data, etc.) associated with the user device. The device classification engine 266, in part, assists user devices, when needed, in classification of a given user device based on data (e.g., beacon data, rule data, trigger data, etc.) associated with the user device. Classification can also occur on the user device by the rule and trigger application modules 252 of the spatial data processing engines 250. In such cases, classification data can be forwarded (e.g., see message $130_2$ and message $130_3$) from the user device to the data management server 111. Further, in some embodiments, a data aggregation engine 267 stores new data (e.g., user device classifications, etc.) in a profile storage location. Such storage (e.g., in a multi-tier regime such as is discussed in FIG. 6) can result in various data aggregation operations (e.g., updating, merging, bridging, etc.).

The components shown in block diagram 2B00 enable systems that can capture user activity and intentions across multiple locations and devices, and bridge spatial information with online profile information. Specifically, the spatial data processing engines 250 support a common architecture and protocol (e.g., protocol 120) for receiving unlimited sets of rules and triggers for any beacons the app and underlying data client are authorized to access. A single app or multiple apps deploying the spatial data processing engines 250 can then capture information about a device and its user across multiple physical locations. In addition to enabling the upload of unlimited sets of rules and triggers, data management server 111 can also aggregate device and user data profiles, connecting profile data across sites as well as across devices (e.g., mobile device $113_1$ and laptop 102) and user environments (e.g., mobile and online).

As earlier mentioned, the rules/triggers configuration engine 261 provides, in part, the administrator interface (e.g., through data client device 109) for the app developer or another authorized user to configure and upload the rules and triggers for all beacons associated with each app. One embodiment of such an administrator interface is described in FIG. 2C.

Figure 2C:
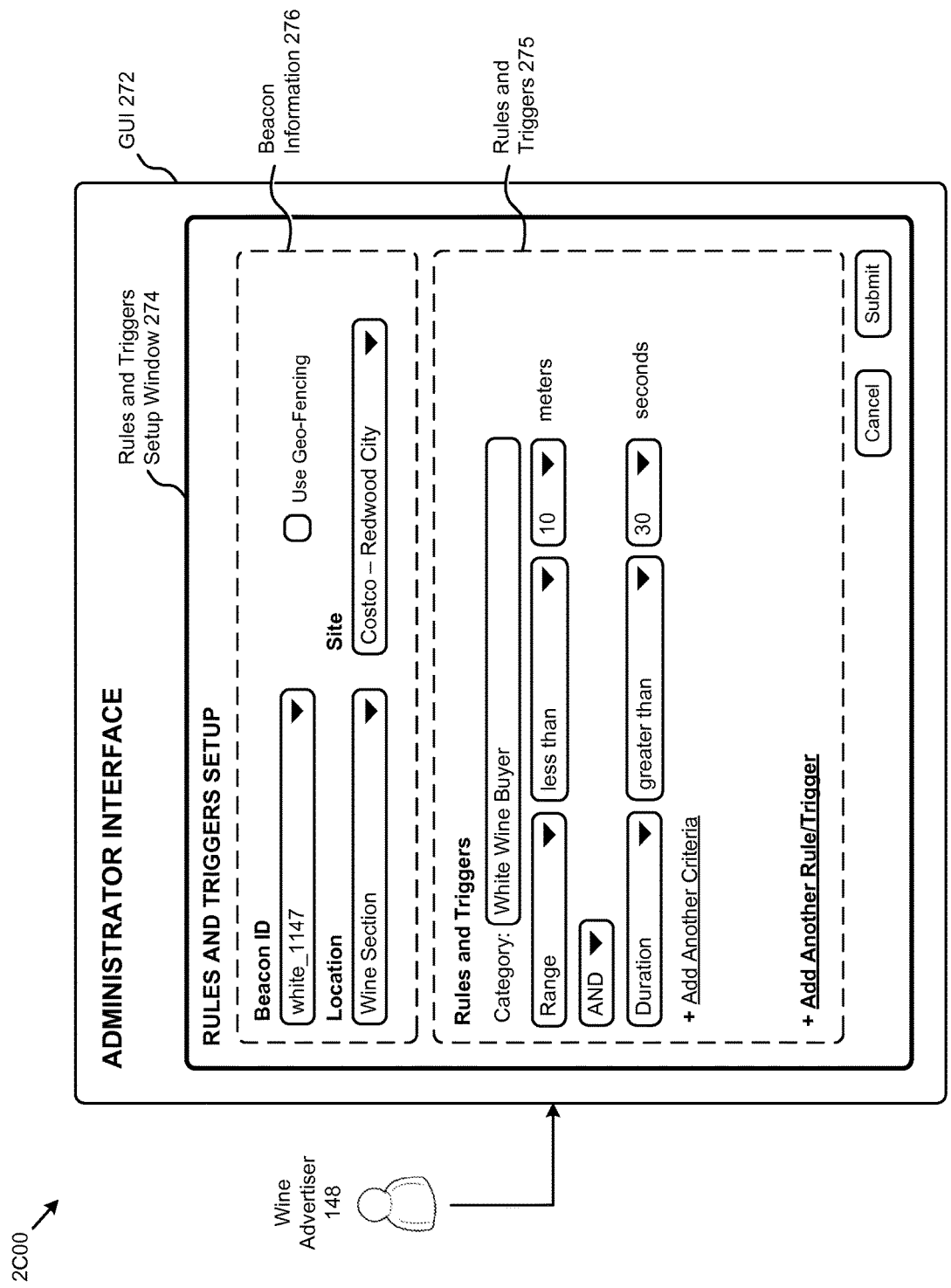
FIG. 2C depicts an administrator interface for specifying rules and triggers used for collecting and classifying spatial information, according to an embodiment.

FIG. 2C depicts an administrator interface 2C00 for specifying rules and triggers used for collecting and classifying spatial information. As an option, one or more instances of administrator interface 2C00 or any aspect thereof may be implemented in the context of the architecture and functionality of the embodiments described herein. Also, the administrator interface 2C00 or any aspect thereof may be implemented in any desired environment.

Some embodiments of administrator interface 2C00 can be a web-based graphical user interface or GUI 272 designed to interact with data client administrators (e.g., advertising campaign managers, app developers, etc.) to establish rules and triggers associated with beacons as implemented in systems for collecting and classifying spatial information. In some embodiments, GUI 272 can be presented to the administrator by a browser application on a computing device (e.g., data client device 109). Specifically, in the embodiment and example shown, GUI 272 can display a rules and triggers setup window 274 to the wine advertiser 148 of commercial environment 1B00. The rules and triggers setup window 274 presents various input entry elements (e.g., dropdown selections, text boxes, etc.) through which the wine advertiser 148 can establish rules and triggers associated with one or more respective beacons. More specifically, in one or more embodiments, the wine advertiser 148 can specify a set of beacon information 276 that describes the beacon associated with the rules and triggers to be defined. For example, the wine advertiser 148 can select beacon "white_1147" that is located in the "Wine Section" of "Costco—Redwood City". This selection can be from a list of available beacons established as the beacons are physically installed in the respective locations. In some embodiments, the wine advertiser 148 can select "Use Geo-Fencing" to define rules and triggers for a target location established using multiple beacons (see FIG. 4 for more details). The wine advertiser 148 can then refer to a rules and triggers 275 display area to specify the rules and triggers associated with the "white_1147" beacon. More specifically, the wine advertiser 148 can establish a category of "White Wine Buyer" for a user (e.g., with a mobile device) that is within 10 meters of the "white_1147" beacon "AND" remains within that range for more than 30 seconds. As shown, the wine advertiser 148 can add more criteria to the aforementioned rule, and/or add another rule and/or trigger (e.g., a reassess trigger, a terminal trigger, etc.). Deployment of such rules and triggers are discussed further in FIG. 3A.

Figure 3A:
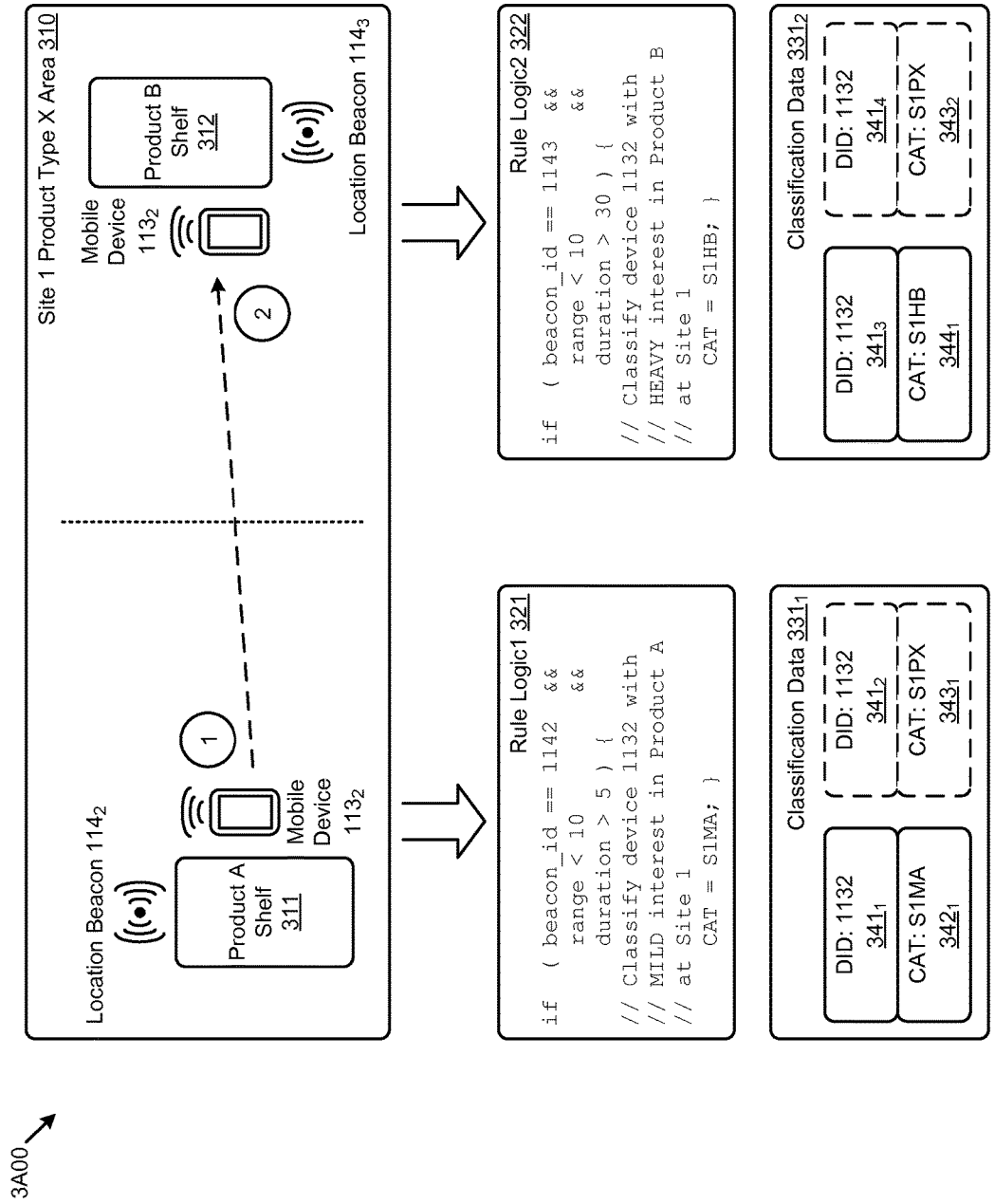
FIG. 3A is a visual representation of a rule-based classification technique as used in systems that combine location beacons with pushed rules and triggers for determining user interest based on spatial information, according to an embodiment.

FIG. 3A is a visual representation 3A00 of a rule-based classification technique as used in systems that combine location beacons with pushed rules and triggers for determining user interest based on spatial information. As an option, one or more instances of visual representation 3A00 or any aspect thereof may be implemented in the context of the architecture and functionality of the embodiments described herein. Also, the visual representation 3A00 or any aspect thereof may be implemented in any desired environment.

As shown in FIG. 3A, visual representation 3A00 comprises a site1 product type X area 310 that includes a product A shelf 311 in proximity of a location beacon $114_2$ (e.g., having a beacon_id). The representation further comprises a product B shelf 312 in proximity of a different location beacon $114_3$. A user carrying a mobile device $113_2$ starts in a first position by product A, and then moves to a second position by product B. Visual representation 3A00 depicts two examples of rule logic: a rule logic1 321 and a rule logic2 322. Other types and implementations of rule logic can be deployed in other examples and embodiments.

When in the first position, rule logic1 321 is processed (e.g., by an instance of spatial data processing engines 250) on an app running on the mobile device $113_2$ to produce the classification data $331_1$. The code comprising the rule logic1 321 can be assumed to have been previously uploaded (e.g., in a rules and triggers push file from data management server 111) in response to previously captured and processed beacon data. While a single app can be designed to work across numerous sites, a given push file can include just the rules and triggers for the currently detected site and beacon for optimal efficiency and user experience. In visual representation 3A00, the rule logic1 321 shows that if the mobile device $113_2$ is within 10 feet of location beacon $114_2$ for more than 5 seconds, mobile device $113_2$ can be classified as having a "mild interest in product A at site1 " (e.g., CAT=S1MA). A representation of this classification is shown in the classification data (e.g., see data $341_1$ and data 3420. Since the mobile device $113_2$ is also in the site1 product type X area 310, mobile device $113_2$ could also be classified as having a "general interest in product type X" (e.g., CAT=S1PX). A representation of this classification is also shown in the classification data $331_1$ (e.g., see data $341_2$ and data $343_1$). With this approach of using a more sophisticated application of beacon data and rules, device user intention can be classified and used to determine future actions. User intentions can be codified into user interest indications, and such user interest indications can be transmitted to a data management server, such as data management server 111.

Referring again to FIG. 3A, when the user and the mobile device $113_2$ is in proximity of the second position, rule logic2 322 is processed (e.g., by an instance of spatial data processing engines 250) on an app running on the mobile device $113_2$ to produce and store records comprising classification data $331_2$. The code comprising the rule logic2 322 can be assumed to have been previously uploaded (e.g., in a rules and triggers push file from data management server 111) in response to previously captured and processed beacon data. While a single app can be designed to work across numerous sites, a given push file can include just the rules and triggers for the currently detected site and beacon for optimal efficiency and user experience. In visual representation 3A00, the rule logic2 322 shows that if the mobile device $113_2$ is within 10 feet of location beacon $114_3$ for more than 30 seconds, mobile device $113_2$ can be classified as having a "heavy interest in product B at site1 " (e.g., CAT=S1HB). A representation of this classification is shown in the classification data $331_2$ (e.g., see data $341_3$ and data $344_1$). Since the mobile device $113_2$ is also in the site1 product type X area 310, mobile device $113_2$ could also be classified as having a "general interest in product type X" (e.g., CAT=S1PX). A representation of this classification is also shown in the classification data $331_2$ (e.g., see data $341_4$ and data $343_2$). With this approach of using a more sophisticated application of beacon data and rules, device user intention can be classified and used to determine future actions.

Figure 3B:
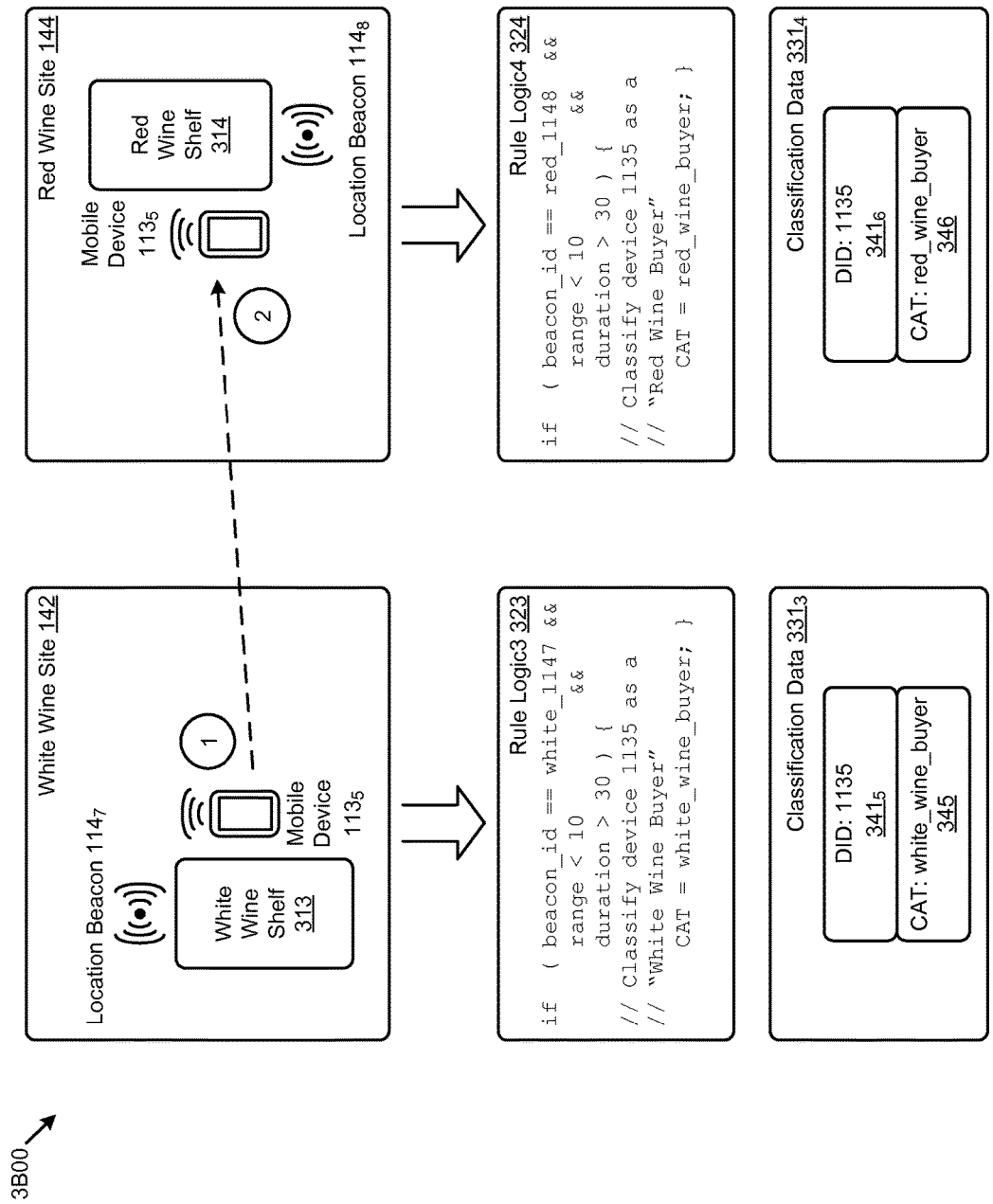
FIG. 3B is an example of a rule-based classification technique as used in systems that combine location beacons with pushed rules and triggers for determining user interest based on spatial information, according to an embodiment.

FIG. 3B is an example of a rule-based classification technique 3B00 as used in systems that combine location beacons with pushed rules and triggers for determining user interest based on spatial information. As an option, one or more instances of rule-based classification technique 3B00 or any aspect thereof may be implemented in the context of the architecture and functionality of the embodiments described herein. Also, the rule-based classification technique 3B00 or any aspect thereof may be implemented in any desired environment.

As shown in FIG. 3B, the herein disclosed techniques for combining location beacons with pushed rules and triggers for determining user interest based on spatial information are applied to an example commercial environment, such as the commercial environment 1B00. Specifically, FIG. 3B comprises the white wine site 142 that includes a white wine shelf 313 in proximity of the location beacon $114_7$ (e.g., beacon_id=white_1147). Further, the red wine site 144 is shown to include a red wine shelf 314 in proximity of the location beacon $114_8$ (e.g., beacon_id=red_1148). A user carrying the mobile device $113_5$ visits the white wine shelf 313 of the white wine site 142, and then visits the red wine shelf 314 of the red wine site 144 at a later time. The rule-based classification technique 3B00 depicts two examples of rule logic: a rule logic3 323 and a rule logic4 324. Other types and implementations of rule logic can be deployed in other examples and embodiments.

When the user is in the first position near the white wine shelf 313, rule logic3 323 is processed on an app running on the mobile device $113_5$ to produce classification data $331_3$. The rule logic3 323 shows that if the mobile device $113_5$ is within 10 feet of beacon white_1147 for more than 30 seconds, the user carrying the mobile device can be classified as a "white wine buyer" (e.g., CAT=white_wine_buyer). A representation of this classification is shown in the classification data $331_3$ (e.g., see data $341_5$ and data 345). When the user with mobile device $113_5$ is in proximity of the second position near the red wine shelf 314, rule logic4 324 is processed on an app running on the mobile device $113_5$ to produce classification data $331_4$. The rule logic4 324 shows that if the mobile device $113_5$ is within 10 feet of beacon red_1148 for more than 30 seconds, the user can be classified as a "red wine buyer" (e.g., CAT=red_wine_buyer). A representation of this classification is shown in the classification data $331_4$ (e.g., see data $341_6$ and data 346). With this approach of using a more sophisticated application of beacon data and rules, device user intention can be classified and used to determine future actions. For example, a wine advertiser (e.g., wine advertiser 148) can send a push a notification concerning white wine when the user is near the white wine shelf 313, and push a notification concerning red wine when the user is near the red wine shelf 314.

Figure 4:
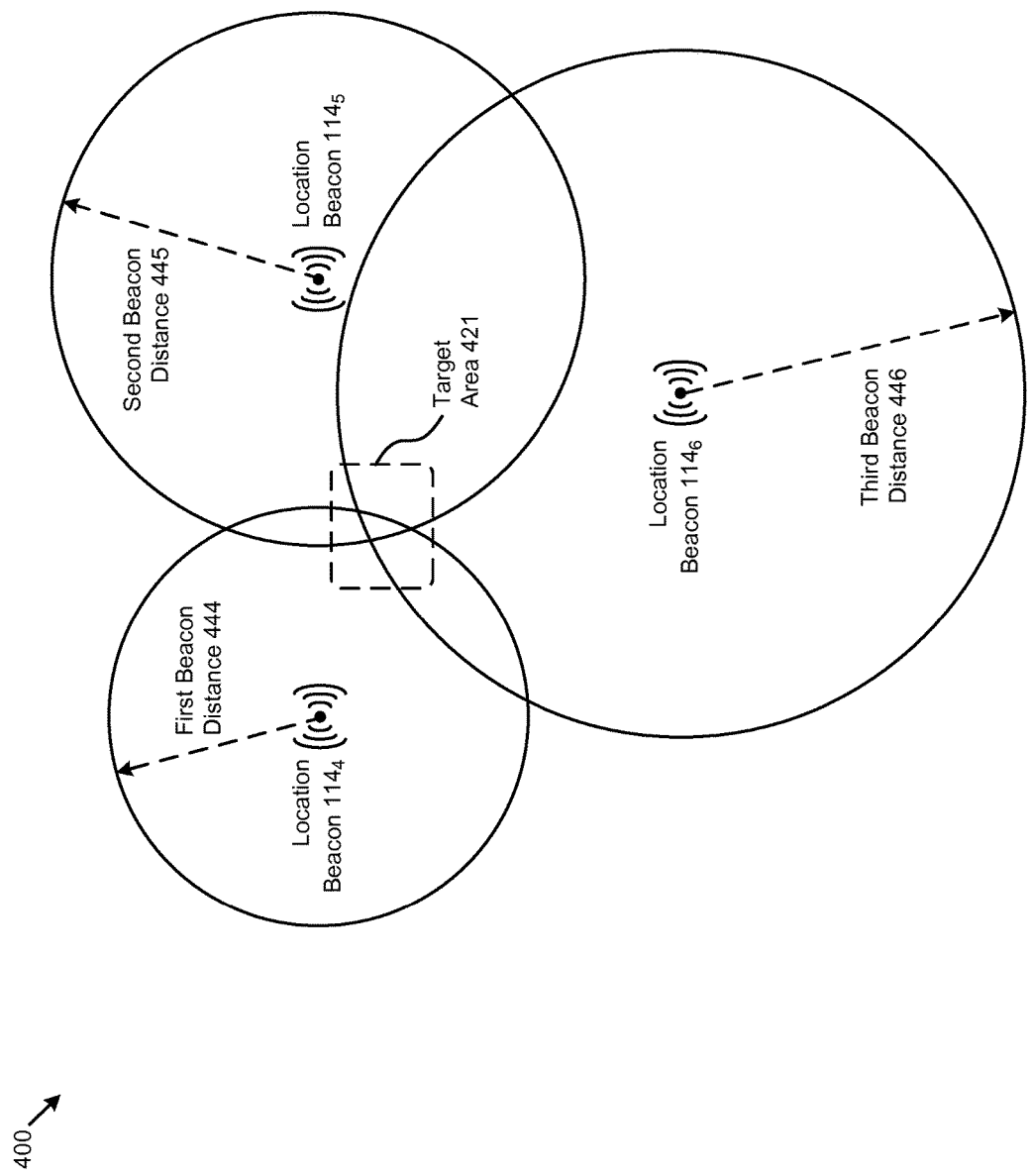
FIG. 4 presents an overhead view showing overlapping beacon ranges as used to implement geo-fencing, according to one embodiment.

FIG. 4 presents an overhead view 400 showing overlapping beacon ranges as used to implement geo-fencing. As an option, one or more instances of overhead view 400 or any aspect thereof may be implemented in the context of the architecture and functionality of the embodiments described herein. Also, the overhead view 400 or any aspect thereof may be implemented in any desired environment.

As shown in FIG. 4, overhead view 400 comprises three beacons (e.g., location beacon $114_4$, location beacon $114_5$, and location beacon $114_6$), each with a corresponding distance (e.g., first beacon distance 444, second beacon distance 445, and third beacon distance 446), where a signal from each beacon propagates into a target area 421. Using a single beacon a device anywhere on the circle of radius equal to first beacon distance 444 and centered around location beacon $114_4$ would receive the same beacon distance data (e.g., 20-30 feet). Using just this information, a position within the target area could not be conclusively determined. However, using a "geo-fencing" techniques that includes criteria from two or more beacons (e.g., 20-30 feet from location beacon $114_4$, 30-40 feet from location beacon $114_5$, 40-50 feet from location beacon $114_6$, etc.) a more precise device position can be determined. In some embodiments, a user interface on data client device 109 can enable the data client to draw a box depicting the target area on a map of their site, and the rules and triggers configuration engine of data management server 111 will generate the geo-fencing parameters to include in associated rules and triggers. Such rules and triggers can fire or otherwise be applied on the mobile device.

Figure 5A:
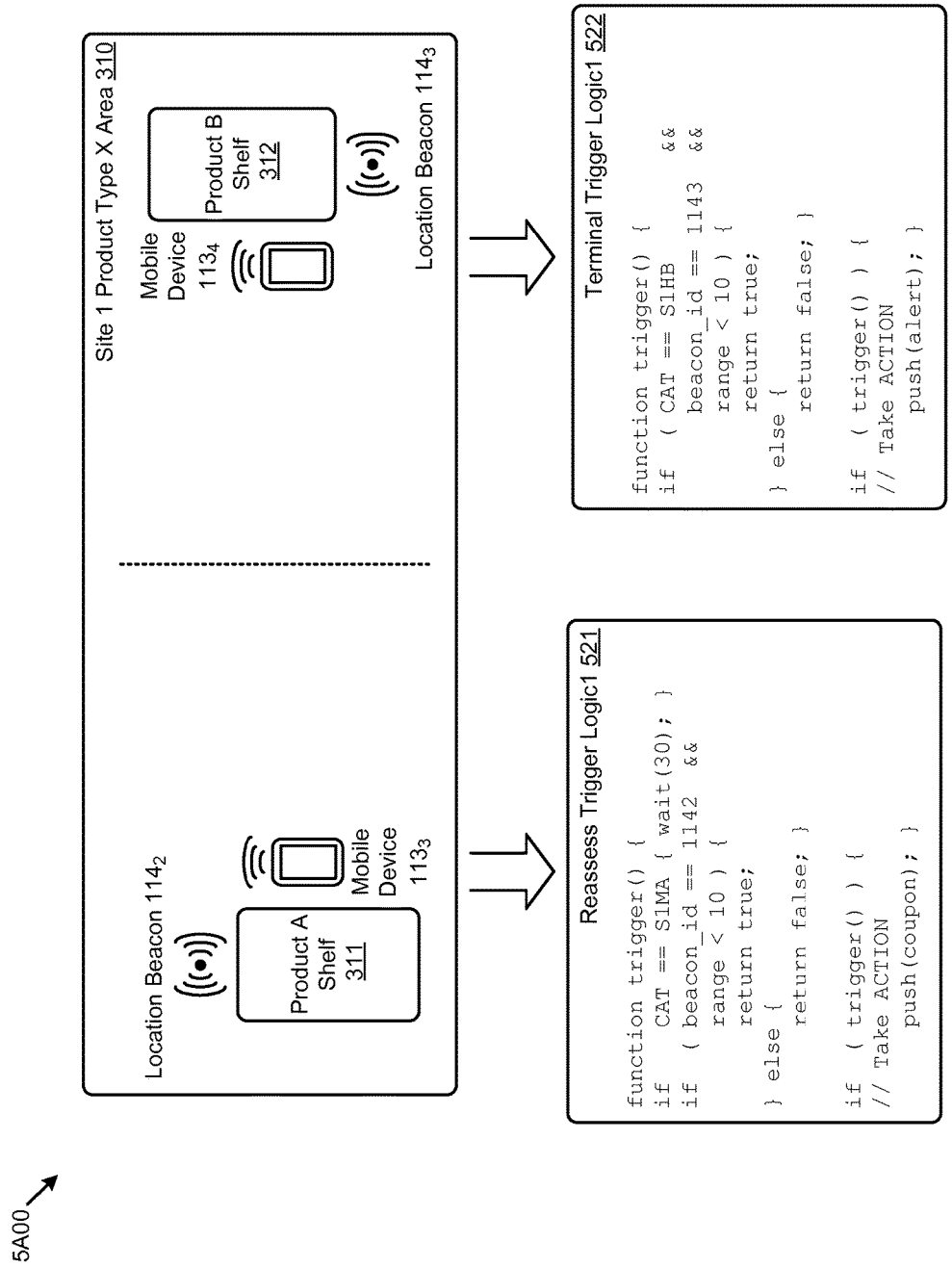
FIG. 5A presents an in-situ representation of application of trigger logic as used for predicting user interest based on spatial information, according to an embodiment.

FIG. 5A presents an in-situ representation 5A00 of application of trigger logic as used for predicting user interest based on spatial information. As an option, one or more instances of in-situ representation 5A00 or any aspect thereof may be implemented in the context of the architecture and functionality of the embodiments described herein. Also, the in-situ representation 5A00 or any aspect thereof may be implemented in any desired environment.

As shown in FIG. 5A, in-situ representation 5A00 comprises the site1 product type X area 310, product A shelf 311 in proximity of the location beacon $114_2$ (e.g., having a beacon_id), and product B shelf 312 in proximity of the location beacon $114_3$ (e.g., having a different beacon_id). A mobile device $113_3$ (e.g., having a DID) is located near product A, and a mobile device $113_4$ (e.g., having a different DID) is located near product B. The shown in-situ representation 5A00 depicts two types of trigger logic: a reassess trigger logic1 521 and a terminal trigger logic1 522. Other types and implementations of trigger logic can be deployed in other examples and embodiments.

For mobile device $113_3$ near product A, reassess trigger logic1 521 is processed (e.g., by an instance of spatial data processing engines 250) on an app running on the mobile device $113_3$ to determine what, if any, action should be taken. The code comprising the reassess trigger logic can be assumed to have been previously uploaded (e.g., in a rules and triggers push file from data management server 111) in response to previously captured and processed beacon data, classifications, etc. The reassess trigger logic1 521 shows that if the mobile device $113_3$ is classified as S1MA (e.g., "mild interest in product A at site1 "), a wait time of 30 seconds will be executed (e.g., to "reassess" the intentions of the user). If the mobile device $113_3$ is still is within 10 feet of location beacon $114_2$ after the 30 seconds, then the reassess trigger logic1 521 will return a value of "true" for the trigger (e.g., the trigger fires). Otherwise, the reassess trigger logic1 521 will return a value of "false" for the trigger (e.g., mobile device $113_3$ has left the area). The data client can then determine actions (e.g., push notification, coupon alert, event log, etc.) based on the trigger results (e.g., trigger return value).

Similarly, for mobile device $113_4$ near product B, terminal trigger logic1 522 is processed (e.g., by an instance of spatial data processing engines 250) on an app running on the mobile device $113_4$ to determine what, if any, action should be taken. The code comprising the terminal trigger logic can be assumed to have been previously uploaded (e.g., in a rules and triggers push file from data management server 111) in response to previously captured and processed beacon data, classifications, etc. In contrast to the reassess trigger logic1 521, the terminal trigger logic1 522 will assess the trigger as soon as a device is detected. Specifically, if the mobile device $113_4$ is classified as S1HB (e.g., "heavy interest in product B at site1"), and is within 10 feet of location beacon $114_3$, then the terminal trigger logic1 522 will return a value of "true" for the trigger. Otherwise, the terminal trigger logic1 522 will return a value of "false" for the trigger (e.g., mobile device $113_4$ has left the area and/or is not classified as S1HB). The data client can then determine actions (e.g., push notification, coupon alert, event log, etc.) based on the trigger result.

Figure 5B:
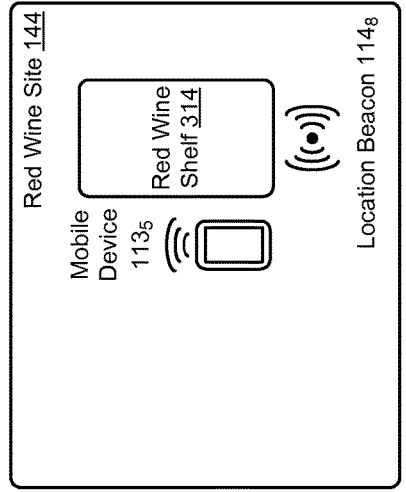
FIG. 5B presents an example of application trigger logic as used for predicting user interest based on spatial information, according to an embodiment.
Figure 5B:
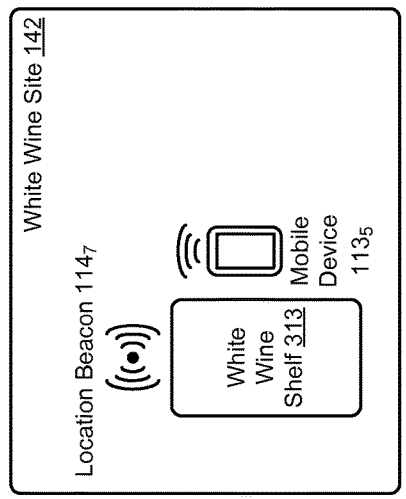

FIG. 5B presents an example of application trigger logic 5B00 as used for predicting user interest based on spatial information. As an option, one or more instances of application trigger logic 5B00 or any aspect thereof may be implemented in the context of the architecture and functionality of the embodiments described herein. Also, the application trigger logic 5B00 or any aspect thereof may be implemented in any desired environment.

As shown in FIG. 5B, the herein disclosed techniques for combining location beacons with pushed rules and triggers for determining user interest based on spatial information are applied to an example commercial environment, such as the commercial environment 1B00. Specifically, FIG. 5B comprises the white wine site 142 that includes the white wine shelf 313 in proximity of the location beacon $114_7$. Further, the red wine site 144 is shown to include the red wine shelf 314 in proximity of the location beacon $114_8$. A user carrying the mobile device $113_5$ visits the white wine shelf 313 of white wine site 142, and then visits the red wine shelf 314 of red wine site 144 at a later time. FIG. 5B depicts two types of trigger logic: a reassess trigger logic2 523 and a terminal trigger logic2 524. Other types and implementations of trigger logic can be deployed in other examples and embodiments.

For mobile device $113_5$ near the white wine shelf 313, reassess trigger logic2 523 is processed on an app running on the mobile device $113_5$ to determine what, if any, action should be taken. The reassess trigger logic2 523 shows that if the mobile device $113_5$ is classified as a "white_wine_buyer", a wait time of 30 seconds will be executed (e.g., to "reassess" the intentions of the user). If the mobile device $113_5$ is still is within 10 feet of location beacon $114_7$ after the 30 seconds, then the reassess trigger logic2 523 will return a value of "true" for the trigger (e.g., the trigger fires). Otherwise, the reassess trigger logic2 523 will return a value of "false" for the trigger (e.g., mobile device $113_5$ has left the area). The data client (e.g., wine advertiser 148) can then determine actions (e.g., push notification, coupon alert, event log, etc.) based on the trigger result (e.g., trigger return value). For example, as shown, the reassess trigger logic2 523 can specify that if a value of "true" is returned, a "white_wine_coupon" will be pushed to the mobile device $113_5$.

For mobile device $113_5$ near the red wine shelf 314, terminal trigger logic2 524 is processed on an app running on the mobile device $113_5$ to determine what, if any, action should be taken. In contrast to the reassess trigger logic2 523, the terminal trigger logic2 524 will assess the trigger as soon as a device is detected. Specifically, if the mobile device $113_5$ is classified as a "red_wine_buyer" and is within 10 feet of location beacon $114_8$, then the terminal trigger logic2 524 will return a value of "true" for the trigger. Otherwise, the terminal trigger logic2 524 will return a value of "false" for the trigger (e.g., mobile device $113_5$ has left the area and/or is not classified as a "red_wine_buyer"). The data client (e.g., wine advertiser 148) can then determine actions (e.g., push notification, coupon alert, event log, etc.) based on the trigger result. For example, as shown, the terminal trigger logic2 524 can specify that if a value of "true" is returned, a "new_red_wine_ad" will be pushed to the mobile device $113_5$.

Figure 6:
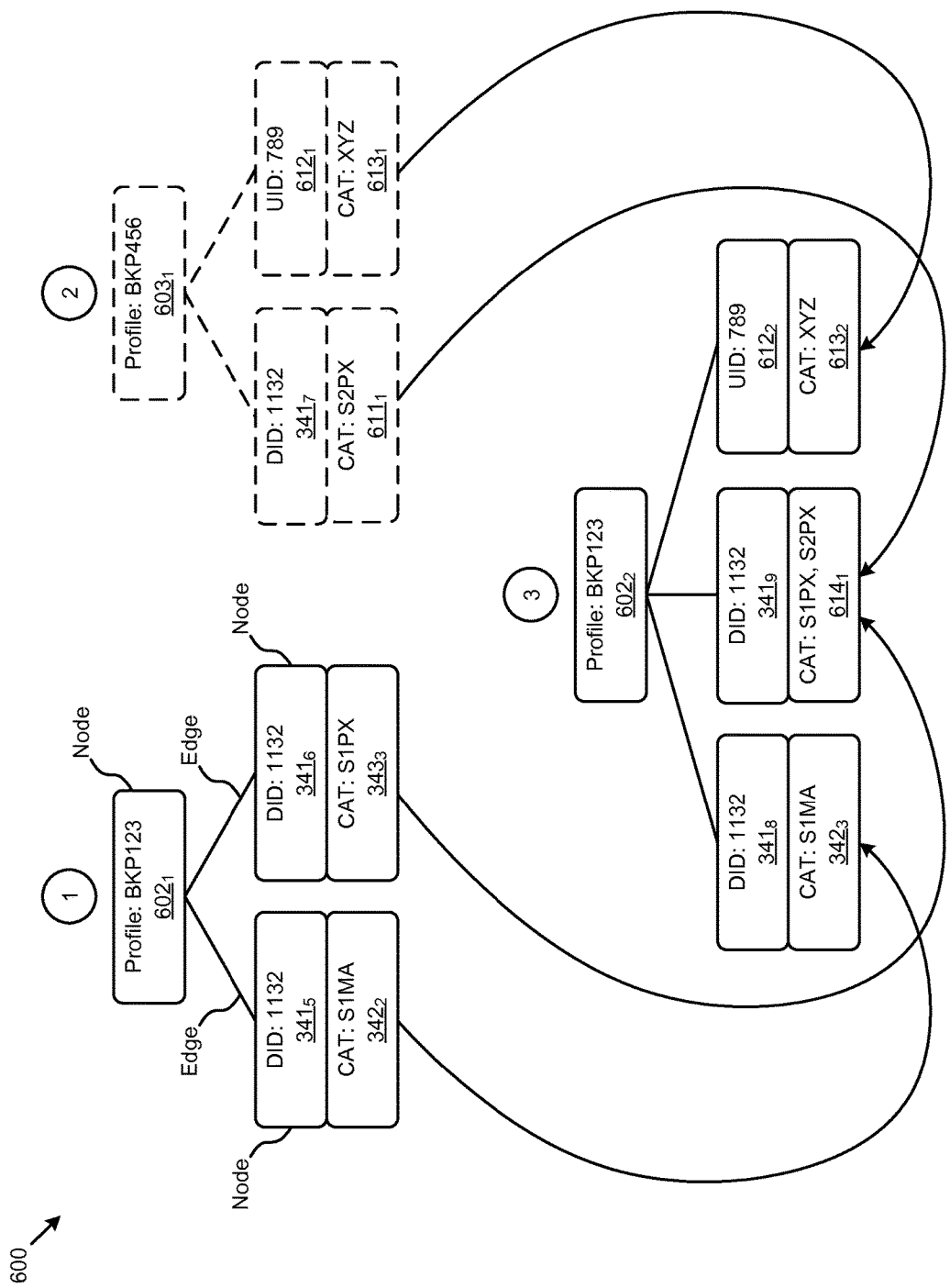
FIG. 6 presents a schematic of a profile data merge operation as used in systems for classifying spatial information to be added to a user profile, according to one embodiment.

FIG. 6 presents a schematic 600 of a profile data merge operation as used in systems for classifying spatial information to be added to a user profile. As an option, one or more instances of schematic 600 or any aspect thereof may be implemented in the context of the architecture and functionality of the embodiments described herein. Also, the schematic 600 or any aspect thereof may be implemented in any desired environment.

As shown in FIG. 6, schematic 600 depicts a profile data merge operation for linking spatial data across devices, across users, and across user environments (e.g., mobile and online). Schematic 600 depicts a profile data merge operation in three views: (1) view 1 shows two categories for a mobile device (e.g., see data $341_5$ and data $342_2$, and data $341_6$ and data $343_3$) as belonging to profile BKP123 (e.g., see data $602_1$); (2) view 2 shows one category for the mobile device (e.g., see data $341_7$ and data $611_1$) and another category for a user (e.g., see data $612_1$ and data $613_1$) as belonging to profile BKP456 (e.g., see data $603_1$); and (3) view 3 shows the result of a merging operation (e.g., by data aggregation engine 267 on data management server 111) of profile BKP456 into profile BKP123 (e.g., see data $602_2$, data $341_8$, data $342_3$, data $341_9$, data $614_1$, data $612_2$, and data $613_2$). Specifically, view 3 shows that the IDs and CATs linked to profile BKP456 are merged under profile BKP123. For example, referring to FIG. 5A, profile BKP123 of view 1 might have been generated by a user with a mobile device while visiting the product A shelf 311 of the site1 product type X area 310 and satisfying the rule logic1 321. Further, profile BKP456 of view 2 might have been generated by a user (e.g., UID 789) that registered on an online website (e.g., providing a phone number associated with the mobile device DID), shopped online (e.g., revealing an interest in category XYZ), and visiting the product type X area of a site 2 (e.g., CAT=S2PX). In this example, the merging operation shown in view 3 serves to associate spatial data from the mobile device (e.g., captured while at physical site 1) with additional spatial data and temporal data from the mobile device and further with other interest data pertaining to the user (e.g., captured online and at physical site 2).

Alternatively, the merge operation could be performed by merging the IDs linked to profile BKP123 into profile BKP456. In either case (e.g., profile BKP123 survives the merge, or profile BKP456 survives the merge), all IDs under the surviving profile have access to data brought in from other IDs during the merge operation. In some cases, two different users may use the same mobile device. In many cases, such a situation can be detected (e.g., using multiple- and cross-device mapping). When the database has evidence of two different users using the same mobile device, the two profiles can be bridged (e.g., as compared to merged) by linking both to the same mobile device ID.

Further details regarding a general approach to merge operations are described in U.S. Application Ser. No. 62/040,197, titled "MULTI-TIER REGIME FOR CREATING AND MANAGING ONLINE USER PROFILES" filed Aug. 21, 2014, which is hereby incorporated by reference in its entirety.

Further details regarding a general approach to multiple- and cross-device mapping are described in U.S. Application Ser. No. 62/072,935, titled "REAL-TIME CROSS-DEVICE USER CATEGORY SYNCHRONIZATION" filed Oct. 30, 2014, which is hereby incorporated by reference in its entirety.

Figure 7A:
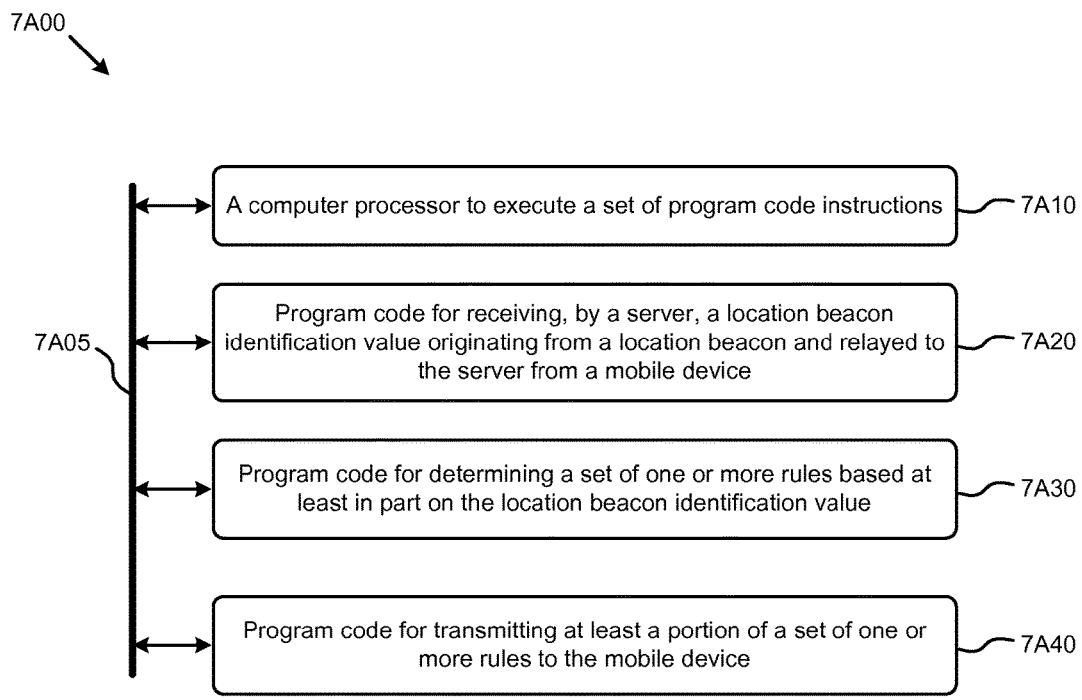
FIG. 7A is a block diagram of a system for collecting and classifying spatial information, according to an embodiment.

FIG. 7A is a block diagram of a system 7A00 for collecting and classifying spatial information. As an option, one or more instances of system 7A00 or any aspect thereof may be implemented in the context of the architecture and functionality of the embodiments described herein. Also, the system 7A00 or any aspect thereof may be implemented in any desired environment.

As shown, system 7A00 comprises at least one processor and at least one memory, the memory serving to store program instructions corresponding to the operations of the system. As shown, an operation can be implemented in whole or in part using program instructions accessible by a module. The modules are connected to a communication path 7A05, and any operation can communicate with other operations over communication path 7A05. The modules of the system can, individually or in combination, perform method operations within system 7A00. Any operations performed within system 7A00 may be performed in any order unless as may be specified in the claims.

The embodiment of FIG. 7A implements a portion of a computer system, shown as system 7A00, comprising a computer processor to execute a set of program code instructions (see module 7A10) and modules for accessing memory to hold program code instructions to perform: receiving, by a server, a location beacon identification value originating from a location beacon and relayed to the server from a mobile device (see module 7A20); determining a set of one or more rules based at least in part on the location beacon identification value (see module 7A30); and transmitting at least a portion of a set of one or more rules to the mobile device (see module 7A40).

Figure 7B:
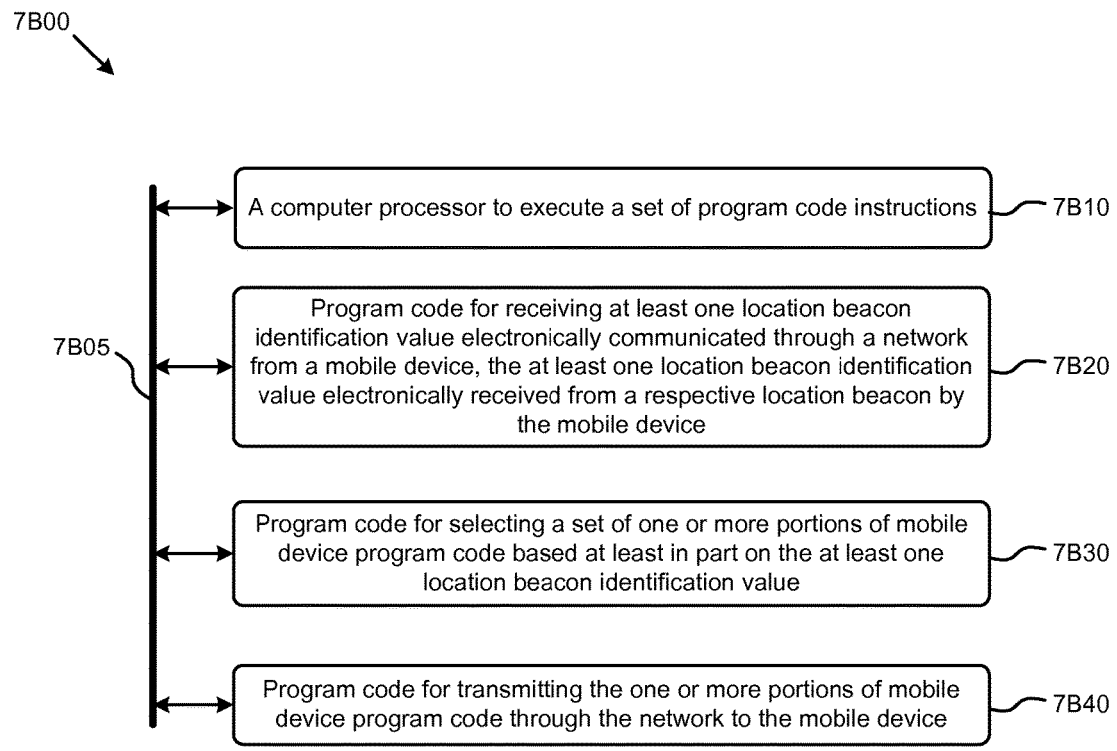
FIG. 7B is a block diagram of a system for collecting and classifying spatial information, according to an embodiment.

FIG. 7B is a block diagram of a system 7B00 for collecting and classifying spatial information. As an option, one or more instances of system 7B00 or any aspect thereof may be implemented in the context of the architecture and functionality of the embodiments described herein. Also, the system 7B00 or any aspect thereof may be implemented in any desired environment.

As shown, system 7B00 comprises at least one processor and at least one memory, the memory serving to store program instructions corresponding to the operations of the system. As shown, an operation can be implemented in whole or in part using program instructions accessible by a module. The modules are connected to a communication path 7B05, and any operation can communicate with other operations over communication path 7B05. The modules of the system can, individually or in combination, perform method operations within system 7B00. Any operations performed within system 7B00 may be performed in any order unless as may be specified in the claims.

The embodiment of FIG. 7B implements a portion of a computer system, shown as system 7B00, comprising a computer processor to execute a set of program code instructions (see module 7B10) and modules for accessing memory to hold program code instructions to perform: receiving at least one location beacon identification value electronically communicated through a network from a mobile device, the at least one location beacon identification value electronically received from a respective location beacon by the mobile device (see module 7B20); selecting a set of one or more portions of program code, rules, triggers or variables based at least in part on the at least one location beacon identification value (see module 7B30); and transmitting the one or more portions of program code, rules, triggers or variables through the network to the mobile device (see module 7B40).

Figure 8:
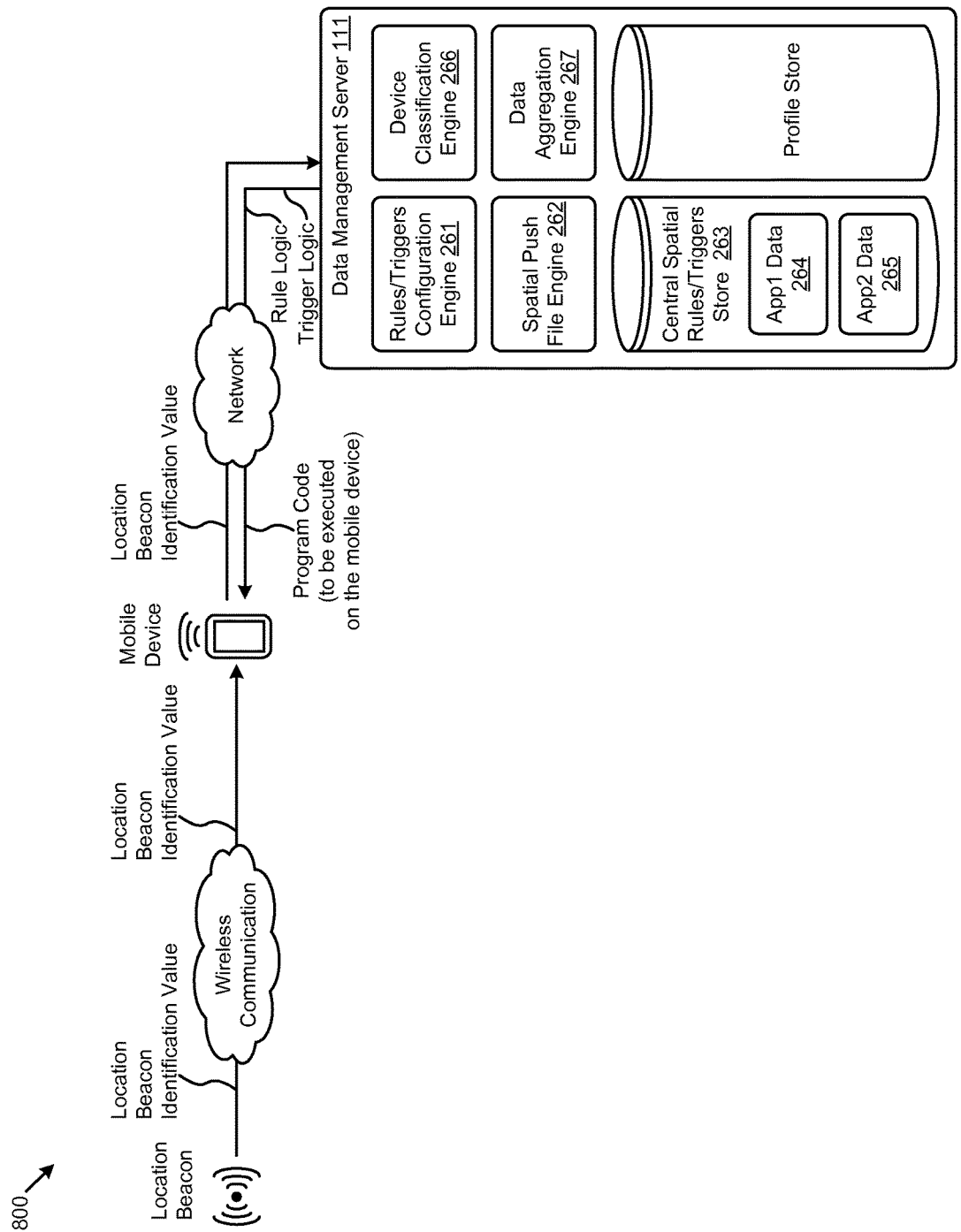
FIG. 8 depicts a system as an arrangement of computing modules that are interconnected so as to operate cooperatively to implement any of the herein-disclosed embodiments.

Additional Embodiments of the Disclosure
Additional Practical Application Examples FIG. 8 depicts a system 800 as an arrangement of computing modules that are interconnected so as to operate cooperatively to implement any of the herein-disclosed embodiments. The partitioning of system 800 is merely illustrative and other partitions are possible.

As shown in FIG. 8, further embodiments can include the system 800 configured for receiving (e.g., at data management server 111) at least one location beacon identification value electronically communicated through a network from a mobile device, the location beacon identification value electronically received from a respective location beacon by the mobile device. The system 800 is further configured for selecting or determining (e.g., by the classification engine, or by the spatial push file engine 262) a set of one or more program code variables (e.g., from central spatial rules/triggers store 263) based at least in part on the at least one location beacon identification value, and transmitting the program code variables electronically through the network to the mobile device. The program code variables can be used to execute various operations (e.g., conditional logic) on the mobile device. In one or more embodiments, the operations can comprise the execution of at least one of a set of rule logic and a set of trigger logic to generate at least one result. In one or more embodiments, the result can also be based in part on a second location beacon identification value. In one or more embodiments, various forms of data classification can be performed in response to the execution of the rule logic. Further, one or more actions can be performed in response to the execution of the trigger logic, where the result from the trigger logic is dependent on at least a portion of the location information and at least one data classification category. The actions in response to the execution of the trigger logic can include the display of content on the mobile device, and the content can be determined by portions of the location information (e.g., based on some particular defined geographical area). The data management server (e.g., the device classification engine 266) or another server can be used to determine an advertiser based on the interest classification and/or user intention. Further, an advertising message (e.g., a demographically-targeted or other customized message or advertisement or coupon, etc.) can be selected based on the advertiser and/or the interest classification and/or the predicted user intention. The advertising message can be displayed on the mobile device.

System Architecture Overview
Additional System Architecture Examples

Figure 9A:
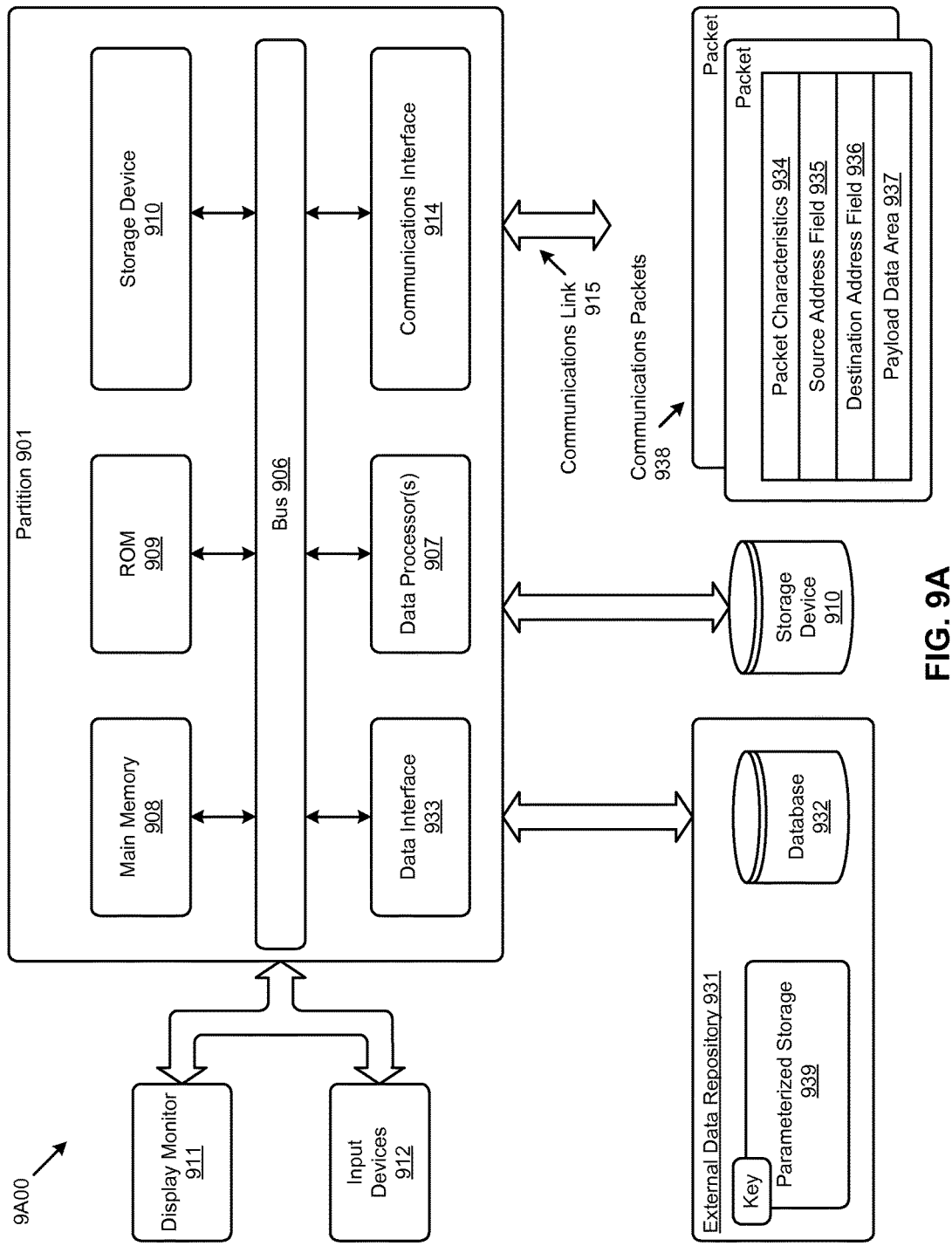
FIG. 9A, FIG. 9B, and FIG. 9C depict exemplary architectures of components suitable for implementing embodiments of the present disclosure, and/or for use in the herein-described environments.

FIG. 9A depicts a block diagram of an instance of a computer system 9A00 suitable for implementing embodiments of the present disclosure. Computer system 9A00 includes a bus 906 or other communication mechanism for communicating information, which interconnects subsystems and devices such as a processor 907, a system memory (e.g., main memory 908, or an area of random access memory RAM), a static storage device (e.g., ROM 909), an internal or external storage device 910 (e.g., magnetic or optical), a data interface 933, a communication interface 914 (e.g., PHY, MAC, Ethernet interface, modem, etc.), a display 911 (e.g., CRT or LCD), input devices 912 (e.g., keyboard, cursor control), and an external data repository 931.

According to an embodiment of the disclosure, computer system 9A00 performs specific operations by processor 907 executing one or more sequences of one or more instructions contained in system memory. Such instructions may be read into system memory from another computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based or can be formed using a combination of hardware and software that implements logic, and/or can carry out computations and/or processing steps using one or more processes and/or one or more tasks and/or one or more threads or any combination therefrom.

According to an embodiment of the disclosure, computer system 9A00 performs specific networking operations using one or more instances of communication interface 914. Instances of the communication interface 914 may comprise one or more networking ports that are configurable (e.g., pertaining to speed, protocol, physical layer characteristics, media access characteristics, etc.) and any particular instance of the communication interface 914 or port thereto can be configured differently from any other particular instance. Portions of a communication protocol can be carried out in whole or in part by any instance of the communication interface 914, and data (e.g., packets, data structures, bit fields, etc.) can be positioned in storage locations within communication interface 914, or within system memory, and such data can be accessed (e.g., using random access addressing, or using direct memory access DMA, etc.) by devices such as processor 907.

The communications link 915 can be configured to transmit (e.g., send, receive, signal, etc.) communications packets 938 comprising any organization of data items. The data items can comprise a payload data area 937, a destination address 936 (e.g., a destination IP address), a source address 935 (e.g., a source IP address), and can include various encodings or formattings of bit fields to populate the shown packet characteristics 934. In some cases the packet characteristics include a version identifier, a packet or payload length, a traffic class, a flow label, etc. In some cases the payload data area 937 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to processor 907 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data. Such data can be stored, for example, in any form of external data repository 931, which in turn can be formatted into any one or more storage areas, and which can comprise parameterized storage 939 accessible by a key (e.g., filename, table name, block address, offset address, etc.).

In an embodiment of the disclosure, execution of the sequences of instructions to practice the disclosure is performed by a single instance of the computer system 9A00. According to certain embodiments of the disclosure, two or more instances of computer system 9A00 coupled by a communications link 915 (e.g., LAN, PTSN, or wireless network) may perform the sequence of instructions required to practice embodiments of the disclosure using two or more instances of components of computer system 9A00.

The computer system 9A00 may transmit and receive messages, data, and instructions including programs (e.g., application code), through communications link 915 and communication interface 914. Received program code may be executed by processor 907 as it is received and/or stored in the shown storage device or in or upon any other non-volatile storage for later execution. Computer system 9A00 may communicate through a data interface 933 to a database 932 on an external data repository 931. Data items in a database can be accessed using a primary key (e.g., a relational database primary key).

The partition 901 of FIG. 9A is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a processor 907. Some embodiments include one or more special-purpose hardware components (e.g., power control, logic, sensors, transducers, etc.). A module may include one or more state machines and/or combinational logic used to implement or facilitate communication of a rule base to a mobile device to deliver spatial information used in determining user interests and predicting user intentions.

Various implementations of the database 932 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate delivering a rule base to a mobile device to deliver spatial information used in determining user interests and predicting user intentions). Such files or records can be brought into and/or stored in volatile or non-volatile memory.

Figure 9B:
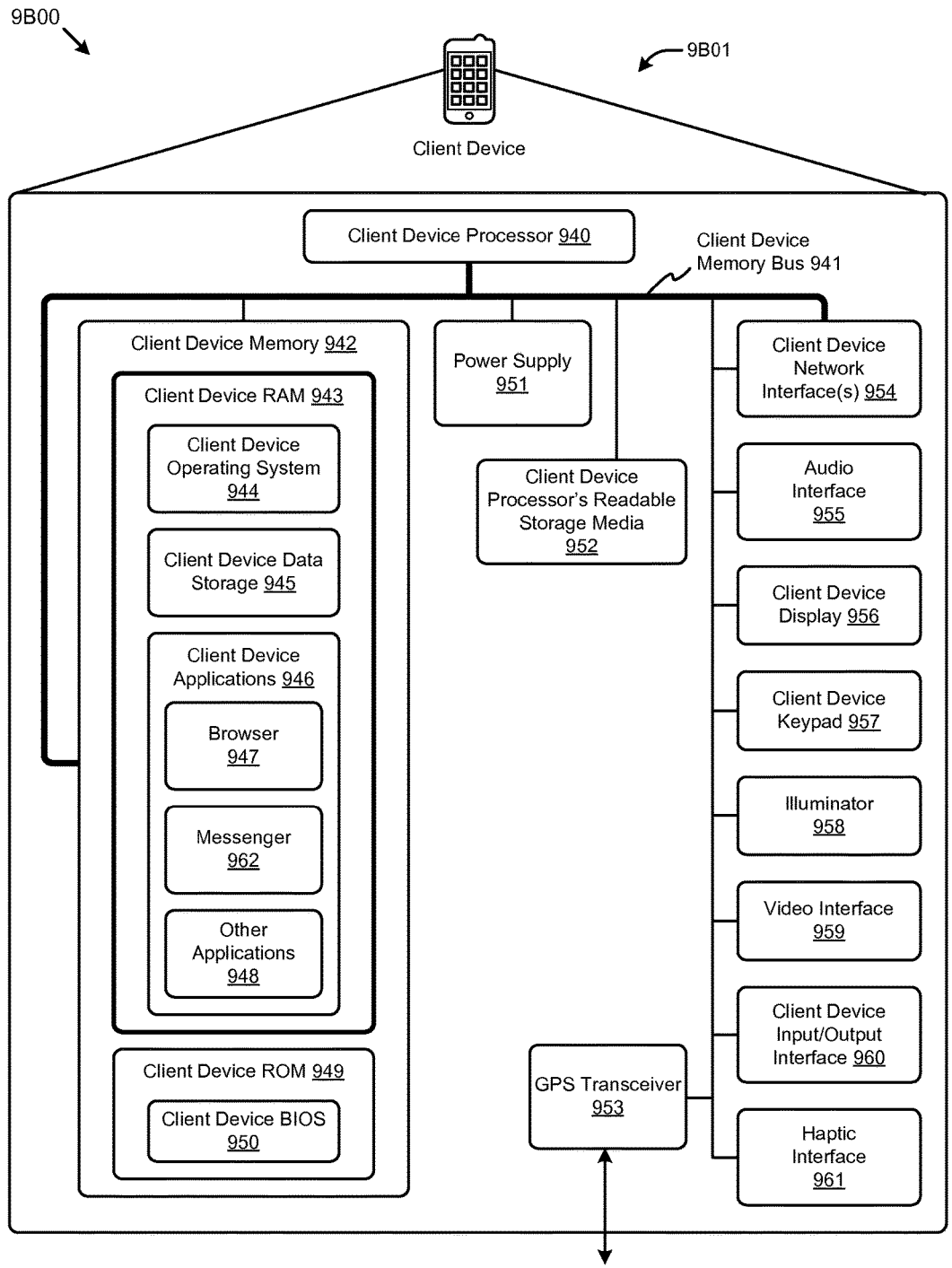

FIG. 9B depicts a block diagram 9B00 of an instance of a client device 9B01 that may be included in a system implementing instances of the herein-disclosed embodiments. Client device 9B01 may include many more or fewer components than those shown in FIG. 9B. Client device 9B01 may represent, for example, an embodiment of at least one of client devices as heretofore disclosed.

As shown in the figure, client device 9B01 includes a client device processor 940 in communication with a client device memory 942 via a client device memory bus 941. Client device 9B01 also includes a power supply 951, one or more client device network interfaces 954, an audio interface 955, a client device display 956, a client device keypad 957, an illuminator 958, a video interface 959, a client device IO interface 960, a haptic interface 961, and a GPS transceiver 953 for global positioning services.

The power supply 951 provides power to client device 9B01. A rechargeable or non-rechargeable battery may be used to provide power. The power may also be provided by an external power source such as an AC adapter or a powered docking cradle that supplements and/or recharges a battery.

A client device 9B01 may optionally communicate with a base station, or directly with another computing device. A client device network interface 954 includes circuitry for coupling a client device 9B01 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), short message service (SMS), general packet radio service (GPRS), wireless access protocol (WAP), ultra wide band (UWB), IEEE 802.16 Worldwide Interoperability for Microwave Access (WiMax), session initiated protocol/real-time transport protocol (SIP/RTP), or any of a variety of other wireless communication protocols. Client device network interface 954 is sometimes known as a transceiver, a transceiving device, or a network interface card (NIC).

An audio interface 955 is arranged to produce and receive audio signals such as the sound of a human voice. For example, audio interface 955 may be coupled to a speaker and microphone to enable telecommunication with others and/or generate an audio acknowledgement for some action.

A client device display 956 may be a liquid crystal display (LCD), gas plasma, light emitting diode (LED), or any other type of display used with a computing device. A client device display 956 may also include a touch sensitive screen arranged to receive input from an object such as a stylus or a digit from a human hand.

A client device keypad 957 may comprise any input device arranged to receive input from a user. For example, client device keypad 957 may include a push button numeric dial, or a keyboard. A client device keypad 957 may also include command buttons that are associated with selecting and sending images.

An illuminator 958 may provide a status indication and/or provide light. Illuminator 958 may remain active for specific periods of time or in response to events. For example, when the illuminator 958 is active, it may backlight the buttons on client device keypad 957 and stay on while the client device is powered. Also, the illuminator 958 may backlight these buttons in various patterns when particular actions are performed such as dialing another client device. An illuminator 958 may also cause light sources positioned within a transparent or translucent case of the client device to illuminate in response to actions.

A video interface 959 is arranged to capture video images such as a still photo, a video segment, an infrared video or the like. For example, the video interface 959 may be coupled to a digital video camera, a web-camera or the like. A video interface 959 may comprise a lens, an image sensor, and other electronics. Image sensors may include a complementary metal-oxide-semiconductor (CMOS) integrated circuit, charge-coupled device (CCD), or any other integrated circuit for sensing light.

Some instances of the shown client device 9B01 comprise a client device IO interface 960 for communicating with external devices such as a headset, or other input or output devices not shown in FIG. 9B. The client device IO interface 960 can use one or more communication technologies such as a USB, infrared, Bluetooth™ port or the like. A haptic interface 961 is arranged to as a human interface device (HID) to facilitate interaction with a user of a client device. Such interaction can include tactile feedback to a user of the client device. For example, the haptic interface 961 may be employed to cause vibration of the client device 9B01 in a particular way (e.g., with a pattern or periodicity) and/or when interacting with one or another user.

A GPS transceiver 953 can determine the physical coordinates of client device 9B01 on the surface of the Earth. The GPS transceiver 953, in some embodiments, may be optional. The shown GPS transceiver 953 outputs a location such as a latitude value and a longitude value. However, the GPS transceiver 953 can also employ other geo-positioning mechanisms including, but not limited to, triangulation, assisted GPS (AGPS), enhanced observed time difference (E-OTD), cell identifier (CI), service area identifier (SAI), enhanced timing advance (ETA), base station subsystem (BSS) or the like, to determine the physical location of client device 9B01 on the surface of the Earth. It is understood that under different conditions, a GPS transceiver 953 can determine a physical location within millimeters for client device 9B01; and in other cases, the determined physical location may be less precise such as within a meter or significantly greater distances. In certain embodiments, the client device 9B01 may provide other information that may be employed to determine a physical location of the device including, for example, a media access control (MAC) address, IP address, IP port identifier, or the like.

The client device memory 942 includes random access memory 943, read-only memory 949, and other storage means. The client device memory 942 illustrates an example of computer readable storage media (devices) for storage of information such as computer readable instructions, data structures, program modules or other data. The client device memory 942 stores a basic IO system (BIOS) in the embodiment of client device BIOS 950 for controlling low-level operation of client device 9B01. The memory also stores an operating system 944 for controlling the operation of client device 9B01. It will be appreciated that this component may include a general-purpose operating system such as a version of UNIX, or LINUX™, or a specialized client communication operating system such as Microsoft Corporation's Windows Mobile™, Apple Corporation's iOS™ Google Corporation's Android™, or the Symbian® operating system. The operating system may include, or interface with a Java virtual machine module that enables control of hardware components and/or operating system operations via Java application programs.

The client device memory 942 further includes one or more instances of client device data storage 945, which can be used by client device 9B01 to store, among other things, client device applications 946 and/or other data. For example, client device data storage 945 may also be employed to store information that describes various capabilities of client device 9B01. The information may then be provided to another device based on any of a variety of events including being sent as part of a header during a communication, sent upon request or the like. Client device data storage 945 may also be employed to store social networking information including address books, buddy lists, aliases, user profile information or the like. Further, client device data storage 945 may also store messages, web page content, or any of a variety of content (e.g., received content, user generated content, etc.).

At least a portion of the information may also be stored on any component or network device including, but not limited, to a client device processor's readable storage media 952, a disk drive or other computer readable storage devices within client device 9B01, etc.

An instance of a client device processor's readable storage media 952 may include volatile, nonvolatile, removable, and non-removable media implemented in any method or technology for storage of information such as computer- or processor-readable instructions, data structures, program modules, or other data. Examples of computer readable storage media include RAM, ROM, electrically erasable programmable read-only memory (EEPROM), flash memory or other memory technology, Compact disc read-only memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device. The aforementioned readable storage media 952 may also be referred to herein as computer readable storage media.

The client device applications 946 may include computer executable instructions which, when executed by client device 9B01, transmit, receive, and/or otherwise process network data. The network data may include, but is not limited to, messages (e.g., SMS, multimedia message service (MMS), instant message (IM), email, and/or other messages), audio, video, and enable telecommunication with another user of another client device. Client device applications 946 may include, for example, a messenger 962, a browser 947, and other applications 948. Certain other applications 948 may include, but are not limited to, calendars, search programs, email clients, IM applications, SMS applications, voice over Internet protocol (VOIP) applications, contact managers, task managers, transcoders, database programs, word processing programs, security applications, spreadsheet programs, games, search programs, and so forth. In some embodiments, other applications 948 may collect and store user data that may be received from other computing devices in the environment.

A messenger 962 may be configured to manage a messaging session using any of a variety of messaging communications including, but not limited to email, SMS, IM, MMS, internet relay chat (IRC), Microsoft IRC (mIRC), really simple syndication (RSS) feeds, and/or the like. For example, in certain embodiments, the messenger 962 may be configured as an IM application such as AOL (America Online) instant messenger, Yahoo! messenger, .NET messenger server, ICQ or the like. In certain embodiments, the messenger 962 may be configured to include a mail user agent (MUA) such as Elm, Pine, message handling (MH), Outlook, Eudora, Mac Mail, Mozilla Thunderbird or the like. In another embodiment, the messenger 962 may be a client device application that is configured to integrate and employ a variety of messaging protocols including, but not limited, to various push and/or pull mechanisms for client device 9B01. In certain embodiments, the messenger 962 may interact with the browser 947 for managing messages. As used herein, the term "message" refers to any of a variety of messaging formats, or communications form including, but not limited to, email, SMS, IM, MMS, IRC or the like.

A browser 947 may include virtually any application configured to receive and display graphics, text, multimedia, messages and the like, employing virtually any web based language. In certain embodiments, the browser application is enabled to employ HDML, WML, WMLScript, JavaScript, SGML, HTML, XML and the like, to display and send a message. However, any of a variety of other web-based programming languages may be employed. In certain embodiments, a browser 947 may enable a user of client device 9B01 to communicate with another network device as may be present in the environment.

Figure 9C:
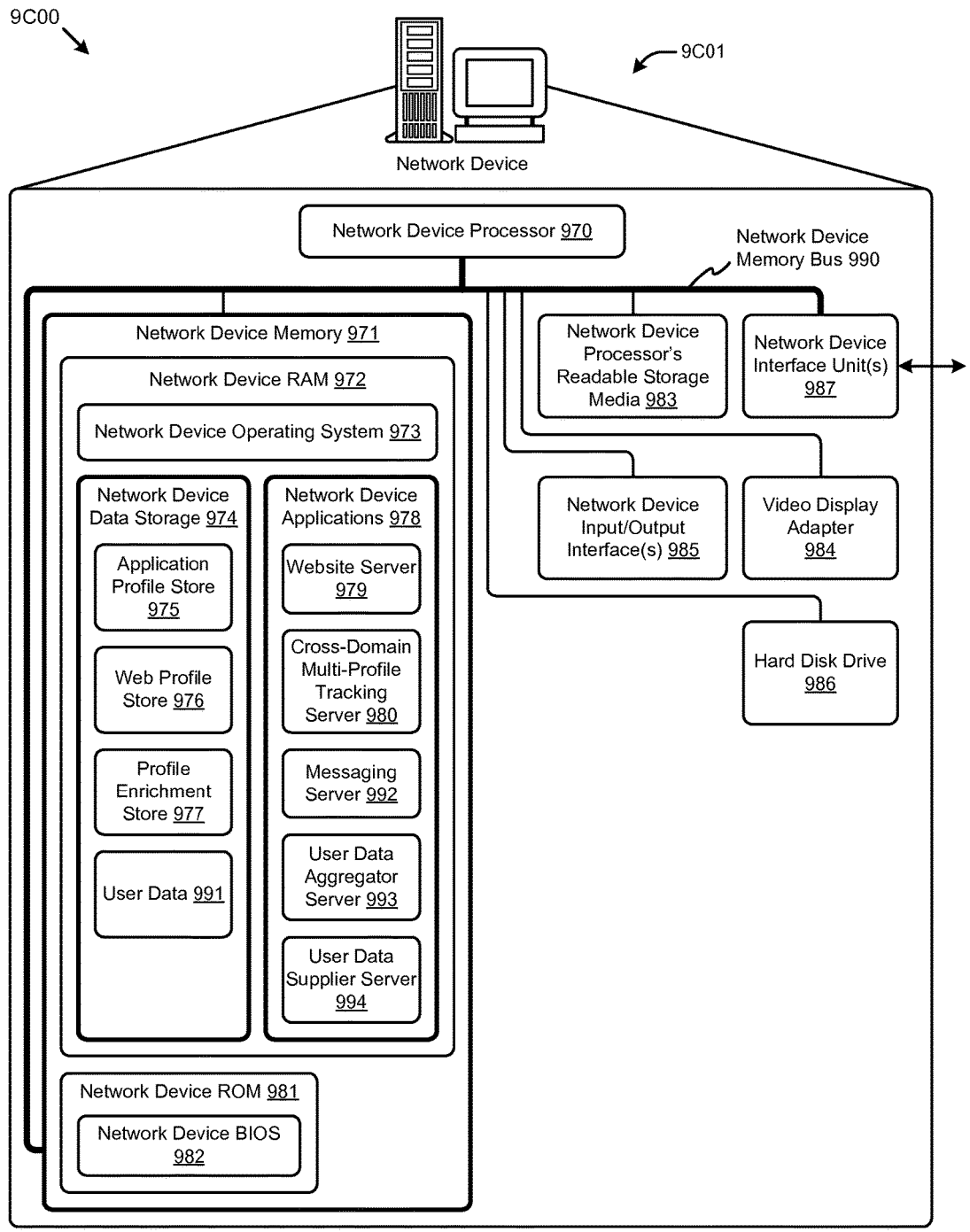

FIG. 9C depicts a block diagram 9C00 of an instance of a network device 9C01 that may be included in a system implementing instances of the herein-disclosed embodiments. Network device 9C01 may include many more or fewer components than those shown. Network device 9C01 may be configured to operate as a server, client, peer, a host, or any other device.

The network device 9C01 includes at least one instance of a network device processor 970, instances of readable storage media 983, network interface(s) 987, a network device IO interface 985, a hard disk drive 986, a video display adapter 984, and a network device memory 971, all in communication with each other via a network device memory bus 990. The network device memory generally includes network device RAM 972, network device ROM 981. Some embodiments include one or more non-volatile mass storage devices such as a hard disk drive 986, a tape drive, an optical drive, and/or a floppy disk drive. The network device memory stores a network device operating system 973 for controlling the operation of network device 9C01. Any general-purpose operating system may be employed. A basic input/output system (BIOS) is also provided in the form of network device BIOS 982 for controlling the low-level operation of network device 9C01. As illustrated in FIG. 9C, a network device 9C01 also can communicate with the Internet, or some other communications network, via a network interface unit 987, which is constructed for use with various communication protocols including the TCP/IP protocol. The network interface unit 987 is sometimes known as a transceiver, a transceiving device, or a network interface card (NIC). Network device 9C01 also comprises a network device IO interface 985 for communicating with external devices such as a keyboard or other input or output devices. A network device IO interface 985 can use one or more communication technologies such as USB, infrared, Bluetooth™ or the like.

The storage devices as described above may use various types of computer readable media, namely non-volatile computer readable storage media and/or a client device processor's readable storage media 983 and/or a network device processor's readable storage media 983. Such media may include any combinations of volatile, nonvolatile, removable, and non-removable media implemented in any method or technology for storage of information such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

As shown, network device data storage 974 may include a database, text storage, a spreadsheet, a folder or directory hierarchy, a file or files or the like that may be configured to maintain and store user account identifiers, user profiles, email addresses, IM addresses, and/or other network addresses or the like. Network device data storage 974 may further include program code, data, algorithms and the like, for use by a processor such as a network device processor 970 to execute and perform actions. In certain embodiments, at least some of the logical contents of network device data storage 974 might be stored on another component of network device 9C01, such as on a second instance of hard disk drive 986 or on an external/removable storage device.

The network device data storage 974 may further store any portions of application data and/or user data such as an application profile store 975, a web profile store 976, a profile enrichment store 977 and/or any user data collected. In some embodiments, user data 991 may store unique user data, non-unique user data, aggregated user data, and/or any combination thereof. User data 991 may include a variety of attributes such as a five digit zip code, an expanded nine digit zip code and the like.

The Network device data storage 974 may also store program code and data. One or more network device applications 978 may be loaded into network device data storage or any other mass memory, to be accessible to run with or as a part of network device operating system 973. Examples of network device application programs may include transcoders, schedulers, calendars, database programs, word processing programs, hypertext transfer protocol (HTTP) programs, customizable user interface programs, IPSec applications, encryption programs, security programs, SMS message servers, IM message servers, email servers, account managers, and so forth. A messaging server 992, website server 979, user data aggregator server 993, a cross-domain multi-profile tracking server 980, and/or user data supplier server 994 may also be included within or implemented as application programs.

A messaging server 992 may include virtually any computing component or components configured and arranged to forward messages from message user agents and/or other message servers, or to deliver messages to a local message store such as network device data storage 974 or the like. Thus, a messaging server 992 may include a message transfer manager to communicate a message employing any of a variety of email protocols including, but not limited, to simple mail transfer protocol (SMTP), post office protocol (POP), Internet message access protocol (IMAP), network new transfer protocol (NNTP) or the like. A messaging server 992 may also be managed by one or more components of the messaging server 992. Thus, the messaging server 992 may also be configured to manage SMS messages; IM, MMS, IRC, or RSS feeds; mIRC; or any of a variety of other message types. In certain embodiments, the messaging server 992 may enable users to initiate and/or otherwise conduct chat sessions, VOIP sessions or the like.

A website server 979 may represent any of a variety of information and services that are configured to provide content, including messages, over a network to another computing device. Thus, a website server 979 can include, for example, a web server, a file transfer protocol (FTP) server, a database server, a content server or the like. A website server 979 may provide the content including messages over the network using any of a variety of formats including, but not limited to WAP, HDML, WML, SGML, HTML, XML, compact HTML (cHTML), extensible HTML (xHTML) or the like. A website server 979 may also be configured to enable a user of a client device to browse websites, upload user data, view and interact with advertisements or the like.

A user data aggregator server 993 is configured to aggregate user data to be provided to user data buyers for advertising campaigns. In certain embodiments, a user data aggregator server 993 may be configured to receive collected user data from a user data supplier server 994. In some embodiments, a user data aggregator server 993 may receive a query for user data. Based on the query, a user data aggregator server 993 may generate a plurality of subsets of aggregated user data. In some embodiments, user data aggregator server 993 may be included in a network device.

A user data supplier server 994 is configured to collect user data. In certain embodiments, the user data supplier server 994 may be configured to provide the collected user data to user data aggregator server 993. In some embodiments, the user data supplier server 994 may collect and/or provide unique user data and/or non-unique user data. In certain embodiments, the user data supplier server 994 may aggregate the collected user data. In some embodiments, the user data supplier server 994 may be included in any computing device such as heretofore described.

Returning to discussion of the heretofore introduced environments, the environments includes components with which various systems can be implemented. Not all of the components shown may be required to practice the embodiments, and variations in the arrangement and type of the components may be made without departing from the spirit or scope of the disclosure.

Various environment in which embodiments of the disclosure operate may include local area networks (LANs)/wide area networks (WANs), wireless networks, client devices (e.g., user stations). The overall network, including any sub-networks and/or wireless networks, are in communication with, and enables communication between components in the environment.

Instances of client devices may include virtually any computing device capable of communicating over a network to send and receive information, including instant messages, performing various online activities or the like. It should be recognized that more or fewer client devices may be included within a system such as described herein, and embodiments are therefore not constrained by the number or type of client devices employed.

Devices that may operate as client devices may include devices that can connect using a wired or wireless communications medium such as personal computers, servers, multiprocessor systems, microprocessor-based or programmable consumer electronics, network PCs or the like. In some embodiments, client devices may include virtually any portable computing device capable of connecting to another computing device and receiving information such as a laptop computer, a smart phone, a tablet computer, or the like. Portable or mobile computer devices are may also include or operate in conjunction with other portable devices such as cellular telephones, display pagers, radio frequency (RF) devices, infrared (IR) devices, personal digital assistants (PDAs), handheld computers, wearable computers integrated devices combining one or more of the preceding devices and the like. As such, client devices can range widely in terms of capabilities and features. Moreover, client devices may provide access to various computing applications including a browser or other web-based applications. A web-enabled client device may include a browser application that is configured to receive and to send web pages, web-based messages and the like. The browser application may be configured to receive and display graphics, text, multimedia and the like, employing virtually any web-based language including a wireless application protocol messages (WAP) and the like. In certain embodiments, the browser application is enabled to employ handheld device markup language (HDML), wireless markup language (WML), WMLScript, JavaScript, standard generalized markup language (SGML), HyperText markup language (HTML), eXtensible markup language (XML) and the like, to display and send a message. In certain embodiments, a user of the client device may employ the browser application to perform various activities over a network (online). However, another application may also be used to perform various online activities.

Client devices may include at least one client application that is configured to receive and/or send data between another computing device (e.g., a server component). The client application may include a capability to provide send and/or receive content or the like. The client application may further provide information that identifies itself including a type, capability, name or the like. In certain embodiments, a client device may uniquely identify itself through any of a variety of mechanisms including a phone number, mobile identification number (MIN), an electronic serial number (ESN), or other mobile device identifier. The information may also indicate a content format that the mobile device is enabled to employ. Such information may be provided in a network packet or the like, sent between other client devices, or sent between other computing devices.

Client devices may be further configured to include a client application that enables an end-user to log into an end-user account that may be managed by another computing device. Such end-user accounts, in one non-limiting example, may be configured to enable the end-user to manage one or more online activities including, in one non-limiting example, search activities, social networking activities, browse various websites, communicate with other users, participate in gaming, interact with various applications or the like. However, participation in online activities may also be performed without logging into the end-user account.

A wireless communication capability is configured to couple client devices and other components with network. Wireless network may include any of a variety of wireless sub-networks that may further overlay stand-alone and/or ad-hoc networks and the like, to provide an infrastructure-oriented connection for client devices. Such sub-networks may include mesh networks, wireless LAN (WLAN) networks, cellular networks and the like. In certain embodiments, the system may include more than one wireless network.

A wireless network may further include an autonomous system of terminals, gateways, routers, mobile network edge devices and the like which may be connected by wireless radio links, etc. Connections may be configured to move freely and randomly and organize themselves arbitrarily such that the topology of a wireless network may change rapidly. A wireless network may further employ a plurality of access technologies including AMPS and/or second generation (2G), and/or third generation (3G), and/or fourth generation (4G) generation radio access for cellular systems, WLAN, wireless router (WR) mesh and the like. The foregoing access technologies as well as emerging and/or future access technologies may enable wide area coverage for mobile devices such as client devices with various degrees of mobility. In one non-limiting example, wireless network may enable a radio connection through a radio network access such as a global system for mobile (GSM) communication, general packet radio services (GPRS), enhanced data GSM environment (EDGE), wideband code division multiple access (WCDMA) and the like. A wireless network may include any wireless communication mechanism by which information may travel between client devices and/or between another computing device and/or between other networks.

Any of the foregoing networks can be configured to couple network devices with other computing devices and communication can include communicating between the Internet. In some situations communication is carried out using combinations of LANs, WANs, as well as direct connections such as through a universal serial bus (USB) port, other forms of computer readable media. On an interconnected set of LANs, including those based on differing architectures and protocols, a router acts as a link between LANs, enabling messages to be sent from one to another. In addition, communication links within LANs may include twisted wire pair or coaxial cable, while communication links between networks may use analog telephone lines, full or fractional dedicated digital lines including T1, T2, T3, and T4, and/or other carrier mechanisms including, for example, E-carriers, integrated services digital networks (ISDNs), digital subscriber lines (DSLs), wireless links including satellite links, or other communications links known to those skilled in the art. Moreover, communication links may further employ any of a variety of digital signaling technologies including, without limit, for example, DS-0, DS-1, DS-2, DS-3, DS-4, OC-3, OC-12, OC-48 or the like. Furthermore, remote computers and other related electronic devices can be remotely connected to either LANs or WANs via a modem and temporary telephone link. In various embodiments, network 108 may be configured to transport information of an Internet protocol (IP). In some cases, communication media carries computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
    storing, at a remote computing system in a rule-base data store, a plurality of rule bases, each rule base defining a plurality of rules that correspond to at least one location beacon identification value;
    storing, at the remote computing system in a profile data store, profile data associated with each of a plurality of mobile devices;
    receiving, by the remote computing system and electronically communicated from a mobile device of the plurality of mobile devices and through a network, at least one location beacon identification value, the at least one location beacon identification value electronically received from a corresponding location beacon by the mobile device;
    identifying, by the remote computing system and based on the at least one location beacon identification value, a rule base from amongst the plurality of rule bases stored in the rule-base data store, the rule base defining a plurality of rules that correspond to the at least one location beacon identification value, the plurality of rules including:
  a first rule that includes first conditional logic that defines:
    a classification trigger that is configured to be effected in response to detecting a presence of the mobile device within an area associated with the respective location beacon for at least a first threshold duration of time; and
    a classification action that identifies a classification to be assigned to the mobile device in response to detecting that the classification trigger is effected,
  a second rule that includes second conditional logic that defines:
    a purge trigger that is configured to be effected in response to detecting that the mobile device has not been within the area associated with the respective location beacon for at least a second threshold duration of time; and
    a purge operation that that is configured to purge the plurality of rules from the mobile device in response to detecting that the purge trigger is effected;
  a third rule that includes third conditional logic that defines:
    a notification trigger that is configured to be effected at least in part in response to detecting that a classification has been assigned to the mobile device; and
    a notification action that identifies a particular notification associated with the classification to be selected and presented at the mobile device in response to detecting that the notification trigger is effected;
  wherein the rule base comprises a set of one or more program code instructions or one or more program code variables;
retrieving, by the remote computing system, at least a portion of the identified rule base from the rule-base data store, the retrieved at least a portion of the identified rule base including the first, second, and third rules;
transmitting, by the remote computing system and to the mobile device through the network, the retrieved at least a portion of the identified rule base
receiving, by the remote computing system and from the mobile device through the network and subsequent to the transmitting, classification data indicating that the classification has been assigned to the mobile device in response to the classification trigger being effected;
modifying, by the remote computing system, profile data associated with the mobile device by aggregating the received classification data with stored profile data associated with the mobile device; and
transmitting, by the remote computing system and to the mobile device through the network, the modified profile data, wherein the third rule includes conditional logic to cause a particular notification to be selected and presented based on the modified profile data.

2. The method of claim 1, wherein the at least one location beacon identification value comprises a respective universally unique identifier (UUID).

3. The method of claim 1, wherein the at least a portion of the identified rule base is transmitted to the mobile device to configure an app stored on the mobile device.

4. A non-transitory computer-readable storage medium, the non-transitory computer-readable storage medium having stored thereon a sequence of instructions which, when executed by a processor causes the processor to execute a process, the process comprising:
storing, in a rule-base data store, a plurality of rule bases, each rule base defining a plurality of rules that correspond to at least one location beacon identification value;
storing, in a profile data store, profile data associated with each of a plurality of mobile devices;
receiving at least one location beacon identification value electronically communicated through a network from a mobile device, the at least one location beacon identification value electronically received from a corresponding location beacon by the mobile device;
identifying, based on the at least one location beacon identification value, a rule base from amongst the plurality of rule bases stored in the rule-base data store, the rule base defining a plurality of rules that correspond to the at least one location beacon identification value, the plurality of rules including:
  a first rule that includes first conditional logic that defines:
    a classification trigger that is configured to be effected in response to detecting a presence of the mobile device within an area associated with the respective location beacon for at least a first threshold duration of time; and
    a classification action that identifies a classification to be assigned to the mobile device in response to detecting that the classification trigger is effected,
  a second rule that includes second conditional logic that defines:
    a purge trigger that is configured to be effected in response to detecting that the mobile device has not been within the area associated with the respective location beacon for at least a second threshold duration of time; and
    a purge operation that that is configured to purge the plurality of rules from the mobile device in response to detecting that the purge trigger is effected;
  a third rule that includes third conditional logic that defines:
    a notification trigger that is configured to be effected at least in part in response to detecting that a classification has been assigned to the mobile device; and
    a notification action that identifies a particular notification associated with the classification to be selected and presented at the mobile device in response to detecting that the notification trigger is effected;
  wherein the rule base comprises a set of one or more program code instructions or one or more program code variables;
retrieving, at least a portion of the identified rule base from the rule-base data store, the retrieved at least a portion of the identified rule base including the first, second, and third rules;
transmitting, to the mobile device through the network, the retrieved at least a portion of the identified rule base
receiving, from the mobile device through the network and subsequent to the transmitting, classification data indicating that the classification has been assigned to the mobile device in response to the classification trigger being effected;

modifying profile data associated with the mobile device by aggregating the received classification data with stored profile data associated with the mobile device; and transmitting, to the mobile device through the network, the modified profile data, wherein the third rule includes conditional logic to cause a particular notification to be selected and presented based on the modified profile data.

5. The non-transitory computer-readable storage medium of claim 4, wherein the at least one location beacon identification value comprises a respective universally unique identifier (UUID).

6. The non-transitory computer-readable storage medium of claim 4, wherein the at least a portion of the identified rule base is transmitted to the mobile device to configure an app stored on the mobile device.

7. The method of claim 1, wherein the classification trigger includes a spatial-trigger trigger that includes:
a spatial specification of a boundary of the area associated with the respective location beacon;
and a temporal specification that identifies the first threshold duration of time.

8. The method of claim 7, wherein the spatial specification of the boundary of the area is defined at least in part based on a plurality of beacon identifiers, each of the plurality of beacon identifiers corresponding to a different particular beacon, and the plurality of beacon identifiers including the at least one location beacon identification value.

9. The method of claim 1, further comprising:
receiving, by the remote computing system and from the mobile device through the network and subsequent to the transmitting, an indication that the classification has been assigned to the mobile device in response to the classification trigger being effected;
in response to the indication, identifying, by the remote computing system, a notification to be presented at the mobile device; and
transmitting by the remote computing system and to the mobile device through the network, the notification to the mobile device.

10. The method of claim 1, wherein the classification trigger identifies an upper distance threshold, such that the area is defined to be centered around a location of the respective location beacon with a radius of the upper distance threshold.

11. The method of claim 1, wherein:
the at least one location beacon identification value is transmitted from the mobile device in response to execution of an application executing on the mobile device, the application being controlled by a client of a plurality of clients of the remote computing system, each client of the plurality of clients having defined a rule of the plurality of rules; and
the rule base is configured to be executed via the application.

12. The method of claim 1, wherein the classification trigger includes reassessment trigger logic to:
initiate a wait time of the first threshold duration of time in response to detecting an initial presence of the mobile device within the area;
detect that the wait time has reached the first threshold duration of time; and
in response to detecting that the wait time has reached the first threshold duration of time, determine whether the mobile device remains within the area, wherein the classification trigger is effected when it is determined that the mobile device remains within the area.

13. The non-transitory computer-readable storage medium of claim 4, wherein the classification trigger includes a spatial-trigger trigger that includes:
a spatial specification of a boundary of the area associated with the respective location beacon; and
a temporal specification that identifies the first threshold duration of time.

14. The non-transitory computer-readable storage medium of claim 13, wherein the spatial specification of the boundary of the area is defined at least in part based on a plurality of beacon identifiers, each of the plurality of beacon identifiers corresponding to a different particular beacon, and the plurality of beacon identifiers including the at least one location beacon identification value.

15. The non-transitory computer-readable storage medium of claim 4, wherein the process further comprises:
receiving, from the mobile device through the network and subsequent to the transmitting, an indication that the classification has been assigned to the mobile device in response to the classification trigger being effected;
in response to the indication, identifying a notification to be presented at the mobile device; and
transmitting, to the mobile device through the network, the notification to the mobile device.

16. The non-transitory computer-readable storage medium of claim 4, wherein:
the at least one location beacon identification value is transmitted from the mobile device in response to execution of an application executing on the mobile device, the application being controlled by a client of a plurality of clients, each client of the plurality of clients having defined a rule of the plurality of rules; and
the rule base is configured to be executed via the application.

17. The non-transitory computer-readable storage medium of claim 4, wherein the classification trigger includes reassessment trigger logic to:
initiate a wait time of the first threshold duration of time in response to detecting an initial presence of the mobile device within the area;
detect that the wait time has reached the first threshold duration of time; and
in response to detecting that the wait time has reached the first threshold duration of time, determine whether the mobile device remains within the area, wherein the classification trigger is effected when it is determined that the mobile device remains within the area.

18. A system comprising:
one or more data processors; and
a non-transitory computer readable storage medium containing instructions which when executed on the one or more data processors, cause the one or more data processors to perform actions including:
storing, in a rule-base data store, a plurality of rule bases, each rule base defining a plurality of respective rules that correspond to at least one respective location beacon identification value;
storing, in a profile data store, profile data associated with each of a plurality of mobile devices;
receiving at least one location beacon identification value electronically communicated through a network from a mobile device, the at least one location beacon identification value electronically received from a corresponding location beacon by the mobile device;

identifying, based on the at least one location beacon identification value, a rule base from amongst the plurality of rule bases stored in the rule-base data store, the rule base defining a plurality of rules that correspond to the at least one location beacon identification value, the plurality of rules including:
- a first rule that includes first conditional logic that defines:
  - a classification trigger that is configured to be effected in response to detecting a presence of the mobile device within an area associated with the respective location beacon for at least a first threshold duration of time; and
  - a classification action that identifies a classification to be assigned to the mobile device in response to detecting that the classification trigger is effected,
- a second rule that includes second conditional logic that defines:
  - a purge trigger that is configured to be effected in response to detecting that the mobile device has not been within the area associated with the respective location beacon for at least a second threshold duration of time; and
  - a purge operation that that is configured to purge the plurality of rules from the mobile device in response to detecting that the purge trigger is effected;
- a third rule that includes third conditional logic that defines:
  - a notification trigger that is configured to be effected at least in part in response to detecting that a classification has been assigned to the mobile device; and
  - a notification action that identifies a particular notification associated with the classification to be selected and presented at the mobile device in response to detecting that the notification trigger is effected;

wherein the rule base comprises a set of one or more program code instructions or one or more program code variables;

retrieving, at least a portion of the identified rule base from the rule-base data store, the retrieved at least a portion of the identified rule base including the first, second, and third rules;

transmitting, to the mobile device through the network, the retrieved at least a portion of the identified rule base receiving, from the mobile device through the network and subsequent to the transmitting, classification data indicating that the classification has been assigned to the mobile device in response to the classification trigger being effected;

modifying profile data associated with the mobile device by aggregating the received classification data with stored profile data associated with the mobile device; and transmitting, to the mobile device through the network, the modified profile data, wherein the third rule includes conditional logic to cause a particular notification to be selected and presented based on the modified profile data.

* * * * *

UNITED STATES PATENT AND TRADEMARK OFFICE
CERTIFICATE OF CORRECTION

PATENT NO. : 10,055,763 B2
APPLICATION NO. : 14/681050
DATED : August 21, 2018
INVENTOR(S) : Scott et al.

Page 1 of 1

It is certified that error appears in the above-identified patent and that said Letters Patent is hereby corrected as shown below:

In the Specification

In Column 14, Line 43, delete "30 seconds" and insert -- 30 seconds --, therefor.

In the Claims

In Column 29, Line 23, in Claim 1, after "that" delete "that".

In Column 30, Line 42, in Claim 4, after "that" delete "that".

In Column 33, Line 29, in Claim 18, after "that" delete "that".

Signed and Sealed this
Ninth Day of July, 2019

Andrei Iancu
*Director of the United States Patent and Trademark Office*